United States Patent
Oliveira et al.

(10) Patent No.: US 9,378,752 B2
(45) Date of Patent: Jun. 28, 2016

(54) SOUND PROCESSING DEVICE, SOUND PROCESSING METHOD, AND SOUND PROCESSING PROGRAM

(71) Applicants: Honda Motor Co., Ltd., Tokyo (JP); UNIVERSIDATE DO PORTO, Oporto (PT); INESC Porto, Oporto (JP)

(72) Inventors: João Lobato Oliveira, Oporto (PT); Gökhan Ince, Wako (JP); Keisuke Nakamura, Wako (JP); Kazuhiro Nakadai, Wako (JP); Hiroshi Okuno, Wako (JP); Luis Paulo Reis, Oporto (PT); Fabien Gouyon, Oporto (PT)

(73) Assignees: Honda Motor Co., Ltd., Tokyo (JP); UNIVERSIDATE DO PORTO, Porto (PT); INESC Porto, Porto (PT)

( * ) Notice: Subject to any disclaimer, the term of this patent is extended or adjusted under 35 U.S.C. 154(b) by 269 days.

(21) Appl. No.: 14/016,901

(22) Filed: Sep. 3, 2013

(65) Prior Publication Data
US 2014/0067385 A1    Mar. 6, 2014

Related U.S. Application Data

(60) Provisional application No. 61/696,960, filed on Sep. 5, 2012.

(51) Int. Cl.
*G10L 15/12* (2006.01)
*G10L 21/0208* (2013.01)
*G10L 25/78* (2013.01)
*G10L 15/26* (2006.01)
(Continued)

(52) U.S. Cl.
CPC ............ *G10L 21/0208* (2013.01); *G10H 1/368* (2013.01); *G10L 15/26* (2013.01); *G10L 25/78* (2013.01); *G10H 2210/046* (2013.01); *G10H 2210/076* (2013.01); *G10H 2240/085* (2013.01); *G10L 15/00* (2013.01); *G10L 21/028* (2013.01)

(58) Field of Classification Search
CPC .......... G10L 15/26; G10L 15/00; G10L 21/00; G10L 21/06; G10L 15/01; G10L 2015/088; G10L 25/78; G06F 17/30746; G06F 17/30775; G01C 21/3608; G08G 1/096872
USPC .......... 704/240, 251, 252, 231, 233, 235, 246, 704/253, 270, 270.1, 275
See application file for complete search history.

(56) References Cited

U.S. PATENT DOCUMENTS 6,185,527 B1 *  2/2001  Petkovic et al. ............... 704/231
6,735,562 B1 *  5/2004  Zhang et al. .................. 704/240

(Continued)

FOREIGN PATENT DOCUMENTS

JP    2010-26513    2/2010
JP    4468777       5/2010

OTHER PUBLICATIONS

Nakadai, Kazuhiro et al., "Active Audition for Humanoid," National Conference on Artificial Intelligence, pp. 832-839 (2000).

(Continued)

*Primary Examiner* — Vijay B Chawan
(74) *Attorney, Agent, or Firm* — Nelson Mullins Riley & Scarborough LLP; Anthony A. Laurentano

(57) ABSTRACT

A sound processing device includes a separation unit configured to separate at least a music signal and a speech signal from a recorded audio signal, a noise suppression unit, a music feature value estimation unit, a speech recognition unit, a noise-processing confidence calculation unit, a music feature value estimation confidence calculation unit, a speech recognition confidence calculation unit, and a control unit configured to calculate at least one behavioral decision function of a speech behavioral decision function associated with speech and a music behavioral decision function associated with music based on a noise-processing confidence value, a music feature value estimation confidence value, and a speech recognition confidence value and to determine behavior corresponding to the calculated behavioral decision function.

5 Claims, 16 Drawing Sheets

(51) Int. Cl.
*G10H 1/36* (2006.01)
*G10L 15/00* (2013.01)
*G10L 21/028* (2013.01)

(56) References Cited

U.S. PATENT DOCUMENTS

| | | | | |
|---|---|---|---|---|
| 8,700,259 | B2* | 4/2014 | Schalk | 701/36 |
| 2002/0143531 | A1* | 10/2002 | Kahn | 704/235 |
| 2005/0131688 | A1* | 6/2005 | Goronzy et al. | 704/240 |
| 2007/0055508 | A1* | 3/2007 | Zhao et al. | 704/226 |
| 2013/0204627 | A1* | 8/2013 | Schalk | 704/270.1 |

OTHER PUBLICATIONS

Oliveira, Joao Lobato et al., "IBT: A Real-Time Tempo and Beat Tracking System," 11th International Society for Music Information Retrieval Conference (ISMIR 2010), pp. 291-296 (2010).

* cited by examiner

| $F_S(n)$ | BEHAVIORAL RESPONSE | STATE |
|---|---|---|
| 3 | OPERATION IS STOPPED | PROACTIVE |
| 2 | NOISE IS SUPPRESSED | |
| 0, 1 | CURRENT OPERATION IS MAINTAINED | ACTIVE |

| $F_M(n)$ | BEHAVIORAL RESPONSE | STATE |
|---|---|---|
| 3 | BEAT TRACKING PROCESS IS RESET | PROACTIVE |
| 2 | BEAT TRACKING PROCESS IS RECOVERED | |
| 0, 1 | CURRENT OPERATION IS MAINTAINED | ACTIVE |

FIG. 19

| UTTERANCE OF PERSON | | UTTERANCE OF ROBOT | |
|---|---|---|---|
| H1 | WOULD YOU REPRODUCE MUSIC? | R1 | YES! |
| H2 | CAN YOU DANCE? | R2 | YES! |
| H3 | WHAT IS TEMPO OF THIS MUSIC? | R3 | TEMPO IS 60 bpm |
| H4 | CHANGE MUSIC! | R4 | YES! |
| H5 | WHAT IS TITLE OF THIS MUSIC? | R5 | TITLE IS POLONAISE |
| H6 | CHANGE MOOD! | R6 | YES! |
| H7 | CHANGE MOOD! | R7 | WOULD YOU PLEASE SPEAK AGAIN? |
| H8 | CHANGE MOOD! | R8 | WOULD YOU PLEASE SPEAK AGAIN? |
| H9 | CHANGE MOOD! | R9 | YES! |
| H10 | CHANGE MOOD! | R10 | YES! |
| H11 | WHO IS SINGER OF THIS MUSIC? | R11 | SINGER IS TOMOMI OGATA |
| H12 | CHANGE DANCE! | R12 | YES! |
| H13 | STOP DANCING! | R13 | YES! |
| H14 | STOP SINGING! | R14 | YES! |

SOUND PROCESSING DEVICE, SOUND PROCESSING METHOD, AND SOUND PROCESSING PROGRAM

CROSS REFERENCE TO RELATED APPLICATIONS

This application claims benefit from U.S. Provisional application Ser. No. 61/696,960, filed Sep. 5, 2012, the contents of which are entirely incorporated herein by reference.

BACKGROUND OF THE INVENTION

1. Field of the Invention

The present invention relates to a sound processing device, a sound processing method, and a sound processing program.

2. Description of Related Art

In recent years, robots such as humanoids or home robots performing social interactions with persons have actively been studied. The study of musical interaction in which a robot is allowed to hear music and is allowed to sing a song or to move its body to the music is important to allow the robot to give a natural and rich expression. In this field of technology, for example, a technique of extracting a beat interval in real time from a music signal collected by the use of a microphone and causing a robot to dance to the beat interval has been proposed (for example, see Japanese Unexamined Patent Application, First Publication No. 2010-026513).

In order to allow a robot to hear speech or music, it is necessary to mount a sound collecting device such as a microphone on the robot. However, sound collected by the sound collecting device of the robot includes a variety of noise. The sound collected by the sound collecting device includes as noise, for example, a variety of sound generated by the robot itself as well as environmental sound generated around the robot. Examples of the sound generated by the robot itself include the footsteps of the robot, the operational sound of motors driven in its body, and spontaneous speech. In this way, when the S/N ratio of the collected audio signal is lowered, accuracy of speech recognition is lowered. Accordingly, a technique of improving a recognition rate of the speech recognition by controlling a robot so as to suppress the operational sound of the robot when speech is uttered by a user while the robot operates has been proposed (for example, see Japanese Patent No. 4468777).

SUMMARY OF THE INVENTION

In order to perform beat tracking without using musical score information when a robot dances or the like, the robot needs to reduce an influence of noise and to accurately detect beat intervals from a music signal. However, when a user speaks during the music, the speech from the user has an adverse influence on detection of the beat intervals. A music signal has an adverse influence on recognition of the speech from the user. Accordingly, there is a problem in that it is difficult for a robot to accurately give a behavioral response to the speech from the user while detecting beat intervals.

The present invention is made in consideration of the above-mentioned problem and an object thereof is to provide a sound processing device, a sound processing method, and a sound processing program which can accurately detect beat intervals and accurately give a behavioral response to speech of a user even when music, speech, and noise are simultaneously input.

(1) In order to achieve the above-mentioned object, according to an aspect of the present invention, a sound processing device is provided including: a separation unit configured to separate at least a music signal and a speech signal from a recorded audio signal; a noise suppression unit configured to perform a noise suppression process of suppressing noise from at least one of the music signal and the speech signal separated by the separation unit; a music feature value estimation unit configured to estimate a feature value of the music signal from the music signal; a speech recognition unit configured to recognize speech from the speech signal; a noise-processing confidence calculation unit configured to calculate a noise-processing confidence value which is a confidence value relevant to the noise suppression process; a music feature value estimation confidence calculation unit configured to calculate a music feature value estimation confidence value which is a confidence value relevant to the process of estimating the feature value of the music signal; a speech recognition confidence calculation unit configured to calculate a speech recognition confidence value which is a confidence value relevant to the speech recognition; and a control unit configured to calculate at least one behavioral decision function of a speech behavioral decision function associated with speech and a music behavioral decision function associated with music based on the noise-processing confidence value, the music feature value estimation confidence value, and the speech recognition confidence value and to determine behavior corresponding to the calculated behavioral decision function.

(2) Another aspect of the present invention provides the sound processing device according to (1), wherein the control unit is configured to determine a behavioral response associated with the speech recognition unit based on the speech behavioral decision function and to determine a behavioral response associated with the music feature value estimation unit based on the music behavioral decision function.

(3) Another aspect of the present invention provides the sound processing device according to (1) or (2), wherein the control unit is configured to reset the music feature value estimation unit when the music feature value estimation confidence value and the speech recognition confidence value are both smaller than a predetermined value.

(4) Another aspect of the present invention provides the sound processing device according to any one of (1) to (3), wherein the speech behavioral decision function is a value calculated based on cost functions calculated based on the noise-processing confidence value, the music feature value estimation confidence value, and the speech recognition confidence value and predetermined weighting coefficients for the calculated cost functions, and wherein the music behavioral decision function is a value calculated based on cost functions calculated based on the noise-processing confidence value, the music feature value estimation confidence value, and the speech recognition confidence value and predetermined weighting coefficients for the calculated cost functions.

(5) According to another aspect of the present invention, a sound processing method is provided including: a separation step of causing a separation unit to separate at least a music signal and a speech signal from a recorded audio signal; a noise suppression step of causing a noise suppression unit to perform a noise suppression process of suppressing noise from at least one of the music signal and the speech signal separated by the separation unit; a music feature value estimating step of causing a music feature value estimation unit to estimate a feature value of the music signal therefrom; a speech recognizing step of causing a speech recognition unit to recognize speech from the speech signal; a noise-processing confidence calculating step of causing a noise-processing confidence calculation unit to calculate a noise-processing confidence value which is a confidence value relevant to the noise suppression process; a music feature value estimation confidence calculating step of causing a music feature value estimation confidence calculation unit to calculate a music feature value estimation confidence value which is a confidence value relevant to the process of estimating the feature value of the music signal; a speech recognition confidence calculating step of causing a speech recognition confidence calculation unit to calculate a speech recognition confidence value which is a confidence value relevant to the speech recognition; and a control step of causing a control unit to calculate at least one behavioral decision function of a speech behavioral decision function associated with speech and a music behavioral decision function associated with music based on the noise-processing confidence value, the music feature value estimation confidence value, and the speech recognition confidence value and to determine behavior corresponding to the calculated behavioral decision function.

(6) According to another aspect of the present invention, a sound processing program is provided causing a computer of a sound processing device to perform: a separation step of separating at least a music signal and a speech signal from a recorded audio signal; a noise suppression step of performing a noise suppression process of suppressing noise from at least one of the music signal and the speech signal separated by the separation unit; a music feature value estimating step of estimating a feature value of the music signal therefrom; a speech recognizing step of recognizing speech from the speech signal; a noise-processing confidence calculating step of calculating a noise-processing confidence value which is a confidence value relevant to the noise suppression process; a music feature value estimation confidence calculating step of calculating a music feature value estimation confidence value which is a confidence value relevant to the process of estimating the feature value of the music signal; a speech recognition confidence calculating step of calculating a speech recognition confidence value which is a confidence value relevant to the speech recognition; and a control step of calculating at least one behavioral decision function of a speech behavioral decision function associated with speech and a music behavioral decision function associated with music based on the noise-processing confidence value, the music feature value estimation confidence value, and the speech recognition confidence value and to determine behavior corresponding to the calculated behavioral decision function.

According to the aspects of (1), (5), and (6) of the present invention, the confidence values of the processes associated with speech, music, and noise are calculated and a response level is determined based on the behavioral decision function calculated based on the calculated confidence values. As a result, the sound processing device according to the present invention can accurately detect beat intervals and accurately give a behavioral response to speech of a user even when music, speech, and noise are simultaneously input.

According to the aspect of (2) of the present invention, the behavioral response associated with the speech recognition unit is determined based on the speech behavioral decision function, the behavioral response associated with the beat interval estimation unit is determined based on the music behavioral decision function, and the speech recognition unit or the beat interval estimation unit is controlled depending on the determined behavioral response. As a result, it is possible to enhance the accuracy of beat interval detection when the accuracy of beat interval detection is lowered and to enhance the accuracy of speech recognition when the accuracy of speech recognition is lowered.

According to the aspect of (3) of the present invention, when the noise-processing confidence value, the beat interval estimation confidence value, and the speech recognition confidence value are all smaller than a predetermined value, the beat interval estimation unit is controlled to be reset. Accordingly, it is possible to enhance the accuracy of beat interval detection when the accuracy of beat interval detection is lowered.

According to the aspect of (4) of the present invention, since the values calculated using the speech behavioral decision function and the music behavioral decision function can be divided into predetermined levels, it is possible to select an appropriate behavioral response depending on the divided levels.

BRIEF DESCRIPTION OF THE DRAWINGS

FIG. 8 is a diagram illustrating an example of an operation determined using a speech fitness function $F_S(n)$ in the embodiment.

FIG. 9 is a diagram illustrating an example of an operation determined using a music fitness function $F_M(n)$ in the embodiment.

FIG. 19 is a diagram illustrating an example of an operation result of a robot when the robot according to this embodiment is allowed to hear music and speech.

DETAILED DESCRIPTION OF THE INVENTION

Hereinafter, an embodiment of the present invention will be described with reference to the accompanying drawings. In this embodiment, an example where a sound processing device is applied to a robot 1 will be described.

Figure 1:
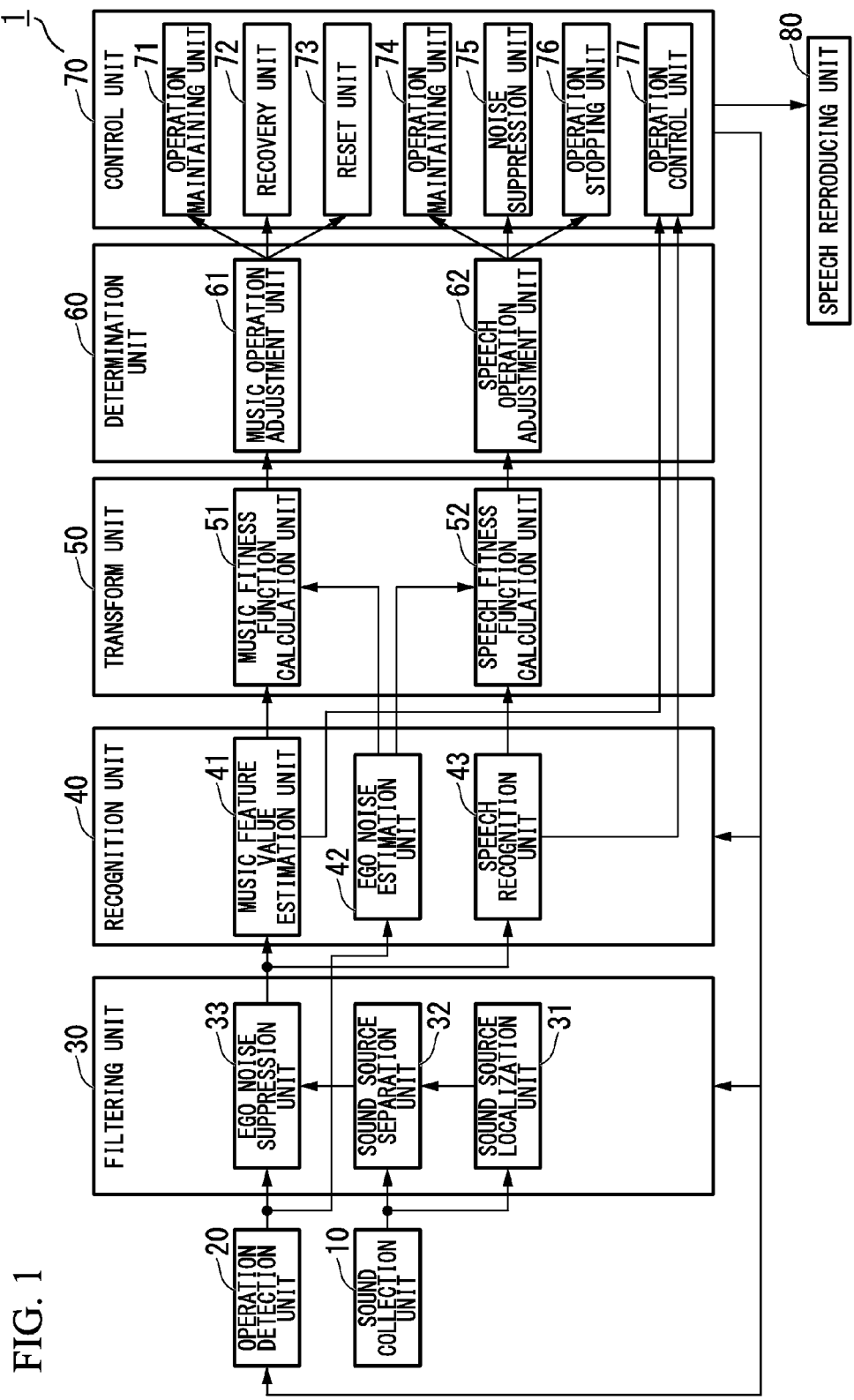
FIG. 1 is a block diagram schematically illustrating a configuration of a robot according to an embodiment of the present invention.

FIG. 1 is a block diagram schematically illustrating a configuration of a robot 1 according to an embodiment of the present invention. As shown in FIG. 1, the robot 1 includes a sound collection unit 10, an operation detection unit 20, a filtering unit 30, a recognition unit 40, a transform unit 50, a determination unit 60, a control unit 70, and a speech reproducing unit 80. The robot 1 also includes motors, mechanisms, and the like not shown in the drawing.

The sound collection unit 10 records audio signals of N (where N is an integer equal to or greater than 1) channels and converts the recorded audio signals of N channels into analog audio signals. Here, the audio signals recorded by the sound collection unit 10 include speech uttered by a person, music output from the speech reproducing unit 80, and ego noise generated by the robot 1. Here, ego noise is a sound including an operational sound of mechanisms or motors of the robot 1 and wind noise of fans for cooling the filtering unit 30 to the control unit 70. The sound collection unit 10 outputs the converted analog audio signal of N channels to the filtering unit 30 in a wired or wireless manner. The sound collection unit 10 is, for example, a microphone receiving sound waves of a frequency band of, for example, 200 Hz to 4 kHz.

The operation detection unit 20 generates an operation signal indicating an operation of the robot 1 in response to an operation control signal input from the control unit 70 and outputs the generated operation signal to the filtering unit 30. Here, the operation detection unit 20 includes, for example, J (where J is an integer equal to or greater than 1) encoders (position sensors), and the encoders are mounted on the corresponding motors of the robot 1 so as to measure angular positions of joints. The operation detection unit 20 calculates angular velocities which are time derivatives of the measured angular positions and angular accelerations which are time derivatives thereof. The operation detection unit 20 combines the angular position, the angular velocity, and the angular acceleration calculated for each encoder to construct a feature vector. The operation detection unit 20 generates an operation signal including the constructed feature vectors and outputs the generated operation signal to the filtering unit 30.

The filtering unit 30 includes a sound source localization unit 31, a sound source separation unit 32, and an ego noise suppression unit 33.

The sound source localization unit 31 estimates a position of each sound source, for example, using a MUSIC (Multiple Signal Classification) method based on the audio signals of N channels input from the sound collection unit 10. Here, the sound source may be an uttering person, a speaker outputting music, or the like. The sound source localization unit 31 includes a storage unit in which a predetermined number of transfer function vectors are stored in correlation with directions. The sound source localization unit 31 calculates a spatial spectrum based on the transfer function vector selected from the storage unit and eigenvectors calculated based on the input audio signals of N channels. The sound source localization unit 31 selects a sound source direction in which the calculated spatial spectrum is the largest and outputs information indicating the selected sound source direction to the sound source separation unit 32.

The sound source separation unit 32 separates the audio signals of N channels input from the sound collection unit 10 into speech signals and music signals, for example, using a GHDSS (Geometric High-order Decorrelation-based Source Separation) method based on the sound source direction input from the sound source localization unit 31. The GHDSS will be described later. The sound source separation unit 32 outputs the separated speech signals and music signals to the ego noise suppression unit 33. The sound source separation unit 32 may perform the sound source separation process, for example, using an independent component analysis (ICA) method. Alternatively, the sound source separation unit 32 may employ another sound source separation process, for example, an adaptive beam forming process of controlling directivity so that sensitivity is the highest in the designated sound source direction.

The ego noise suppression unit 33 suppresses ego noise components of the speech signals and the music signals input from the sound source separation unit 32 based on the operation signal input from the operation detection unit 20. The ego noise suppression unit 33 outputs the music signals whose ego noise components are suppressed to a music feature value estimation unit 41 of the recognition unit 40. The ego noise suppression unit 33 outputs the speech signals whose ego noise components are suppressed to a speech recognition unit 43 of the recognition unit 40. The ego noise suppression unit 33 suppresses the ego noise components, for example, using a technique employing a template as described later. The configuration of the ego noise suppression unit 33 will be described later.

The recognition unit 40 includes a music feature value estimation unit 41, an ego noise estimation unit 42, and a speech recognition unit 43.

The speech recognition unit 43 performs a speech recognizing process on the speech signals input from the filtering unit 30 and recognizes speech details such as phoneme sequences or words. The speech recognition unit 43 includes, for example, a hidden Markov model (HMM) which is an acoustic model and a dictionary. The speech recognition unit 43 calculates sound feature values such as 13 static mel-scale log spectrums (MSLS), 13 delta MSLS, and one delta power every predetermined time in real time. The speech recognition unit 43 determines phonemes from the calculated sound feature values using an acoustic model and recognizes a word, a phrase, or a sentence from the phoneme sequence including the determined phonemes using a dictionary. The speech recognition unit 43 outputs a confidence function $cf_S(n)$ based on the evaluated probabilities of words given from cost functions calculated in the recognition process to a music fitness function calculation unit 51 and a speech fitness function calculation unit 52 of the transform unit 50. Here, n represents the number of frames and is an integer equal to or greater than 1. The subscript "S" of the confidence function $cf_S$ represents speech.

The ego noise estimation unit 42 calculates a level of ego noise $E(n)$ using Expression (1) based on the operation signal input from the operation detection unit 20.

$$E(n) = \frac{1}{J}\sum_{j=1}^{J} v_j(n) \tag{1}$$

In Expression (1), J represents the total number of mechanical joints of the robot 1 and $v_j$ represents the operational velocities of all the mechanical joints of the robot 1. Expression (1) shows that as the operational velocity of a certain mechanical joint of the robot 1 becomes higher, the level of ego noise generated by the joint at the time of operation becomes higher. The ego noise estimation unit 42 outputs the calculated level of ego noise E(n) as a confidence function $cf_E(n)$ to the music fitness function calculation unit 51 and the speech fitness function calculation unit 52 of the transform unit 50. The subscript "E" of the confidence function $cf_E$ represents ego noise.

The music feature value estimation unit 41 estimates a music feature value and outputs the estimated feature value to the transform unit 50 and the control unit 70. The music feature value includes beat intervals (tempo), confidence value of estimated beat intervals (tempo), a title of a piece of music, a genre of a piece of music, and the like. Examples of the genre of a piece of music include classic, rock, jazz, Japanese ballad, Japanese traditional music and dance, folk, and soul. The music feature value estimation unit 41 performs a beat tracking process on the music signals input from the ego noise suppression unit 33, for example, using an IBT (standing for INESC porto Beat Tracker) method described in Reference Document 1. The beat tracking process is a process of detecting beat intervals of a music signal. The music feature value estimation unit 41 outputs a chuck value of best measured values calculated through the beat tracking process as a confidence function $cf_M(n)$ (music feature value estimation confidence value) to the music fitness function calculation unit 51 and the speech fitness function calculation unit 52. The subscript "M" of the confidence function $cf_M$ represents music. The music feature value estimation unit 41 estimates a title of a piece of music, a genre thereof, and the like based on the beat intervals (tempo) estimated through the beat tracking process. The music feature value estimation unit 41 outputs the estimated beat intervals (tempo), the title of a piece of music, the genre thereof, and the like as a music feature value to the control unit 70. The configuration of the music feature value estimation unit 41 and the calculation of the confidence function $cf_M(n)$ will be described later.

The transform unit 50 includes a music fitness function calculation unit 51 and a speech fitness function calculation unit 52.

The music fitness function calculation unit 51 calculates a music fitness function $F_M(n)$ using the confidence functions $cf_S(n)$, $cf_E(n)$, and $cf_M(n)$ input from the recognition unit 40, and outputs the calculated music fitness function $F_M(n)$ to the determination unit 60. The subscript "M" represents music.

The speech fitness function calculation unit 52 calculates a speech fitness function $F_S(n)$ using the confidence functions $cf_S(n)$, $cf_E(n)$, and $cf_M(n)$ input from the recognition unit 40, and outputs the calculated speech fitness function $F_S(n)$ to the determination unit 60. The subscript "S" represents speech.

The music fitness function $F_M(n)$ and the speech fitness function $F_S(n)$ are used for the determination unit 60 to determine the operation of the control unit 70. The calculation of the cost function, the music fitness function $F_M(n)$, and the speech fitness function $F_S(n)$ will be described later.

The determination unit 60 includes a music operation adjustment unit 61 and a speech operation adjustment unit 62.

The music operation adjustment unit 61 determines an operation associated with music based on the music fitness function $F_M(n)$ input from the transform unit 50, and outputs an instruction indicating the determined operation to the control unit 70.

The speech operation adjustment unit 62 determines an operation associated with speech based on the speech fitness function $F_S(n)$ input from the transform unit 50, and outputs an operation instruction indicating the determined operation to the control unit 70. The processes performed by the music operation adjustment unit 61 and the speech operation adjustment unit 62 will be described later.

The control unit 70 includes an operation maintaining unit 71, a recovery unit 72, a reset unit 73, an operation maintaining unit 74, a noise suppression unit 75, an operation stopping unit 76, and an operation control unit 77.

The operation maintaining unit 71 controls the motors of the robot 1 so as to sustain, for example, dancing to recorded music in response to the operation instruction output from the music operation adjustment unit 61. The operation maintaining unit 71 controls the music feature value estimation unit 41 so as to sustain the beat tracking process with the current setting.

The recovery unit 72 controls the music feature value estimation unit 41 so as to recover, for example, the beat tracking process on recorded music in response to the operation instruction output from the music operation adjustment unit 61.

The reset unit 73 controls the music feature value estimation unit 41 so as to reset, for example, the beat tracking process on recorded music in response to the operation instruction output from the music operation adjustment unit 61.

In this way, the operation maintaining unit 71, the recovery unit 72, and the reset unit 73 control the operations associated with the beat tracking process.

For example, when a sentence recognized by the speech recognition unit 43 is an interrogative sentence, the operation maintaining unit 74 controls the speech reproducing unit 80 to give a speech signal so that the robot 1 gives a response to the recognized speech in response to the operation instruction output from the speech operation adjustment unit 62. Alternatively, when a sentence recognized by the speech recognition unit 43 is a sentence indicating an instruction, the operation maintaining unit 74 controls the motors and mechanisms of the robot 1 to cause the robot 1 to give a behavioral response to the recognized speech in response to the operation instruction output from the speech operation adjustment unit 62.

For example, the noise suppression unit 75 controls the motors and mechanisms of the robot 1 so as to cause the robot 1 to operate to lower the volume of music and to facilitate recognition of the recognized speech in response to the operation instruction output from the speech operation adjustment unit 62. Alternatively, the noise suppression unit 75 controls the speech reproducing unit 80 so as to output a speech signal indicating a request for lowering the volume of music in response to the operation instruction output from the speech operation adjustment unit 62. Alternatively, the noise suppression unit 75 controls the speech reproducing unit 80 so as to output a speech signal for repeatedly receiving questions from a speaker in response to the operation instruction output from the speech operation adjustment unit 62.

For example, the operation stopping unit 76 controls the robot 1 so as to operate to stop the reproduction of music in response to the operation instruction output from the speech operation adjustment unit 62. Alternatively, the operation stopping unit 76 controls the motors and mechanisms of the robot 1 so as to suppress the ego noise by stopping the operation of the robot 1 in response to the operation instruction output from the speech operation adjustment unit 62.

As described above, the operation maintaining unit 74, the noise suppression unit 75, and the operation stopping unit 76 control the operations associated with the recognition of speech.

The operation control unit 77 controls the operations of the functional units such as the mechanisms and the motors of the robot 1 based on information indicating the recognized speech output from the recognition unit 40 and information indicating the recognized beat intervals. The operation control unit 77 controls the operations (for example, walking, dancing, and speech) of the robot 1 other than the control of the operations associated with the beat tracking process and the control of the operations associated with the speech recognition. The operation control unit 77 outputs the operation instructions for the mechanisms, the motors, and the like to the operation detection unit 20.

For example, when beat intervals are detected from the input audio signals by the recognition unit 40, the operation control unit 77 controls the robot 1 so as to dance to the recognized beat intervals. Alternatively, when an interrogative sentence is recognized from the input speech signal by the recognition unit 40, the operation control unit 77 controls the speech reproducing unit 80 so as to output a speech signal as a response to the recognized interrogative sentence. For example, when the robot 1 includes an LED (Light Emitting Diode) and the like, the operation control unit 77 may control the LED so as to be turned on and off to the recognized beat intervals.

The speech reproducing unit 80 reproduces a speech signal under the control of the control unit 70. The speech reproducing unit 80 converts text input from the control unit 70 into a speech signal and outputs the converted speech signal from the speaker of the speech reproducing unit 80.

Figure 2:
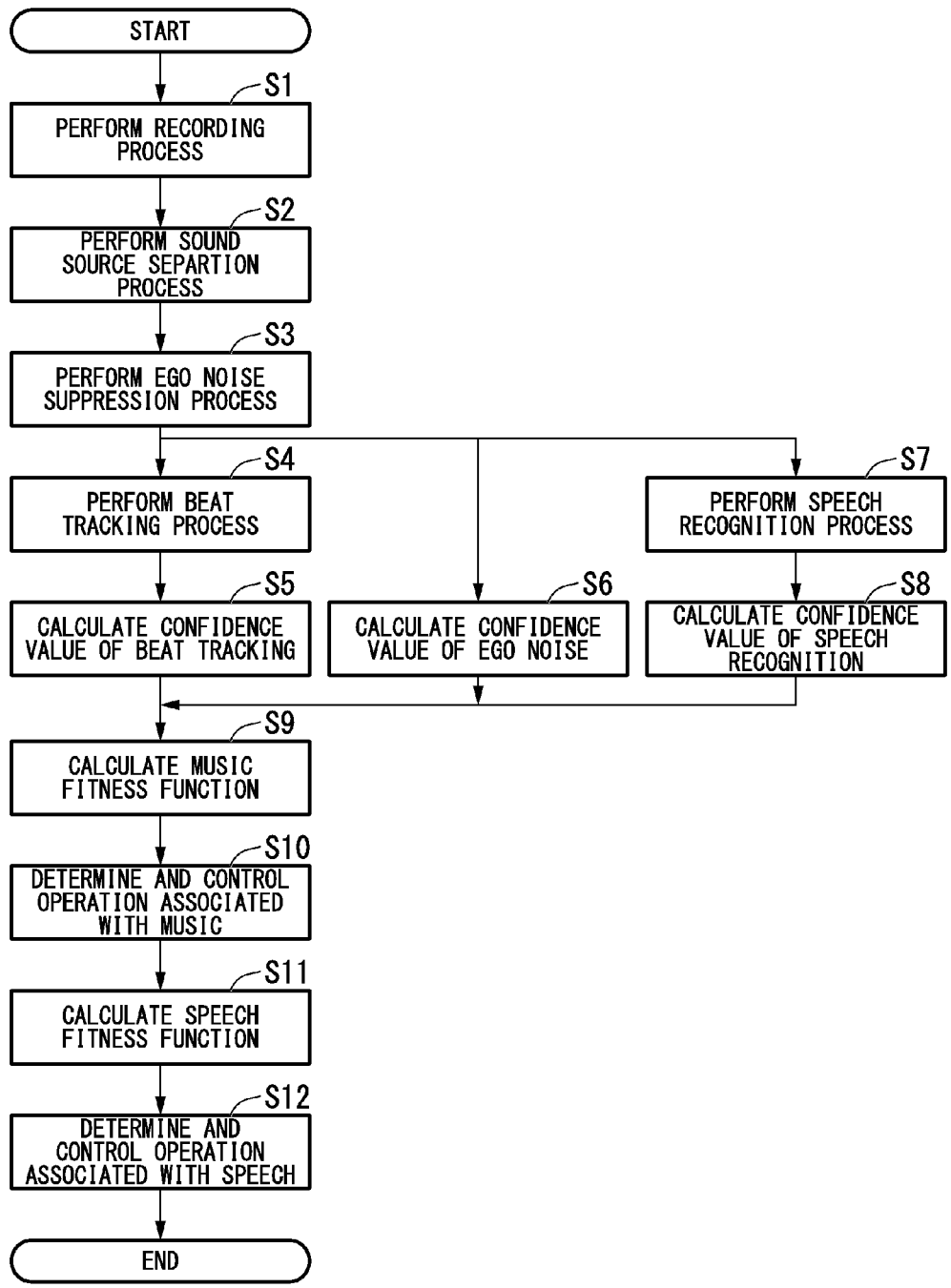
FIG. 2 is a flowchart illustrating an example of a process flow in the robot according to the embodiment.

FIG. 2 is a flowchart illustrating a process flow in the robot 1 according to this embodiment.

(Step S1) The sound collection unit 10 records audio signals of N channels.

(Step S2) The sound source separation unit 32 separates the audio signals of N channels recorded by the sound collection unit 10 into speech signals and music signals, for example, using an independent component analysis method based on the sound source direction input from the sound source localization unit 31.

(Step S3) The ego noise suppression unit 33 estimates ego noise based on the operation signal input from the operation detection unit 20 and suppresses the ego noise components of the speech signals and the music signals input from the sound source separation unit 32.

(Step S4) The music feature value estimation unit 41 performs a beat tracking process on the music signals input from the ego noise suppression unit 33. Then, the music feature value estimation unit 41 outputs information indicating the beat intervals detected through the beat tracking process to the operation control unit 77.

(Step S5) The music feature value estimation unit 41 calculates the confidence function $cf_M(n)$ and outputs the calculated confidence function $cf_M(n)$ to the music fitness function calculation unit 51 and the speech fitness function calculation unit 52.

(Step S6) The ego noise estimation unit 42 calculates a level of ego noise based on the operation signal input from the operation detection unit 20 and outputs the calculated level of ego noise as the confidence function $cf_E(n)$ to the music fitness function calculation unit 51 and the speech fitness function calculation unit 52.

(Step S7) The speech recognition unit 43 performs a speech recognizing process on the speech signals input from the ego noise suppression unit 33 and recognizes speech details such as phoneme sequences or words. Then, the speech recognition unit 43 outputs information indicating the recognized speech details to the operation control unit 77.

(Step S8) The speech recognition unit 43 calculates the confidence functions $cf_S(n)$ based on the evaluated probabilities of words given using the cost functions calculated in the recognition process and outputs the calculated confidence functions $cf_S(n)$ to the music fitness function calculation unit 51 and the speech fitness function calculation unit 52.

(Step S9) The music fitness function calculation unit 51 calculates the music fitness function $F_M(n)$ using the confidence functions $cf_S(n)$, $cf_E(n)$, and $cf_M(n)$ input from the recognition unit 40 and outputs the calculated music fitness function $F_M(n)$ to the determination unit 60.

(Step S10) The music operation adjustment unit 61 determines the operation for music enhancing the accuracy of the beat tracking process or the operation of the robot 1 based on the music fitness function $F_M(n)$ calculated by the music fitness function calculation unit 51. Then, the control unit 70 controls the robot 1 so as to perform the operation determined by the music operation adjustment unit 61.

(Step S11) The speech fitness function calculation unit 52 calculates the speech fitness function $F_S(n)$ using the confidence functions $cf_S(n)$, $cf_E(n)$, and $cf_M(n)$ input from the recognition unit 40 and outputs the calculated speech fitness function $F_S(n)$ to the determination unit 60.

(Step S12) The speech operation adjustment unit 62 determines the operation for enhancing the accuracy of the speech recognizing process or determines the operation of the robot 1 based on the speech fitness function $F_S(n)$ calculated by the speech fitness function calculation unit 52. Then, the control unit 70 controls the robot 1 so as to perform the operation determined by the speech operation adjustment unit 62.

In this way, the process flow of the robot 1 ends.

Regarding the order in which steps S9 and S10 and steps S11 and S12 are performed, any of steps S9 and S10 and steps S11 and S12 may be first performed, or steps S9 and S10 and steps S11 and S12 may be performed in parallel. GHDSS Method The GHDSS method used in the sound source separation unit 32 will be described below. The GHDSS method is a method combining a geometric constraint-based source separation (GC) method and a high-order discorrelation-based source separation (HDSS) method. The GHDSS method is a kind of blind deconvolution. The GHDSS method is a method of separating audio signals into an audio signal of each of sound sources by sequentially calculating separation matrices $[V(\omega)]$ and multiplying an input speech vector $[X(\bullet)]$ by the calculated separation matrices $[V(\omega)]$ to estimate a sound source vector $[u(\omega)]$. The separation matrix $[V(\omega)]$ is a pseudo-inverse matrix of a transfer function $[H(\omega)]$ having transfer functions from the sound sources to microphones of the sound collection unit 10 as elements. The input speech vector $[X(\omega)]$ is a vector having frequency-domain coefficients of the audio signals of the channels as elements. The sound source vector $[u(\omega)]$ is a vector having frequency-domain coefficients of the audio signals emitted from the sound sources as elements.

In the GHDSS method, the sound source vector $[u(\omega)]$ is estimated to minimize two cost functions of a separation sharpness $J_{SS}$ and a geometric constraint $J_{GC}$ at the time of calculating the separation matrix $[V(\omega)]$.

Here, the separation sharpness $J_{SS}$ is an index value indicating the degree by which one sound source is erroneously separated as another sound source and is expressed, for example, by Expression (2).

$$J_{SS}=\|[u(\omega)\mathbf{I}u(\omega)]^*-\text{diag}([u(\omega)\mathbf{I}u(\omega)]^*\|^2 \qquad (2)$$

In Expression (2), ‖ ... ‖² represents Frobenius norm. * represents the conjugate transpose of a vector or a matrix. In addition, diag( ... ) represent a diagonal matrix including diagonal elements.

The geometric constraint $J_{GC}$ is an index value indicating a degree of error of the sound source vector [u(ω)] and is expressed, for example, by Expression (3).

$$J_{GC} = \|\text{diag}([V(\omega)]^* A(\omega)) - [I]\|^2 \quad (3)$$

In Expression (3), [I] represents a unit matrix.

The detailed configuration of the filtering unit 30 will be described below.

Figure 3:
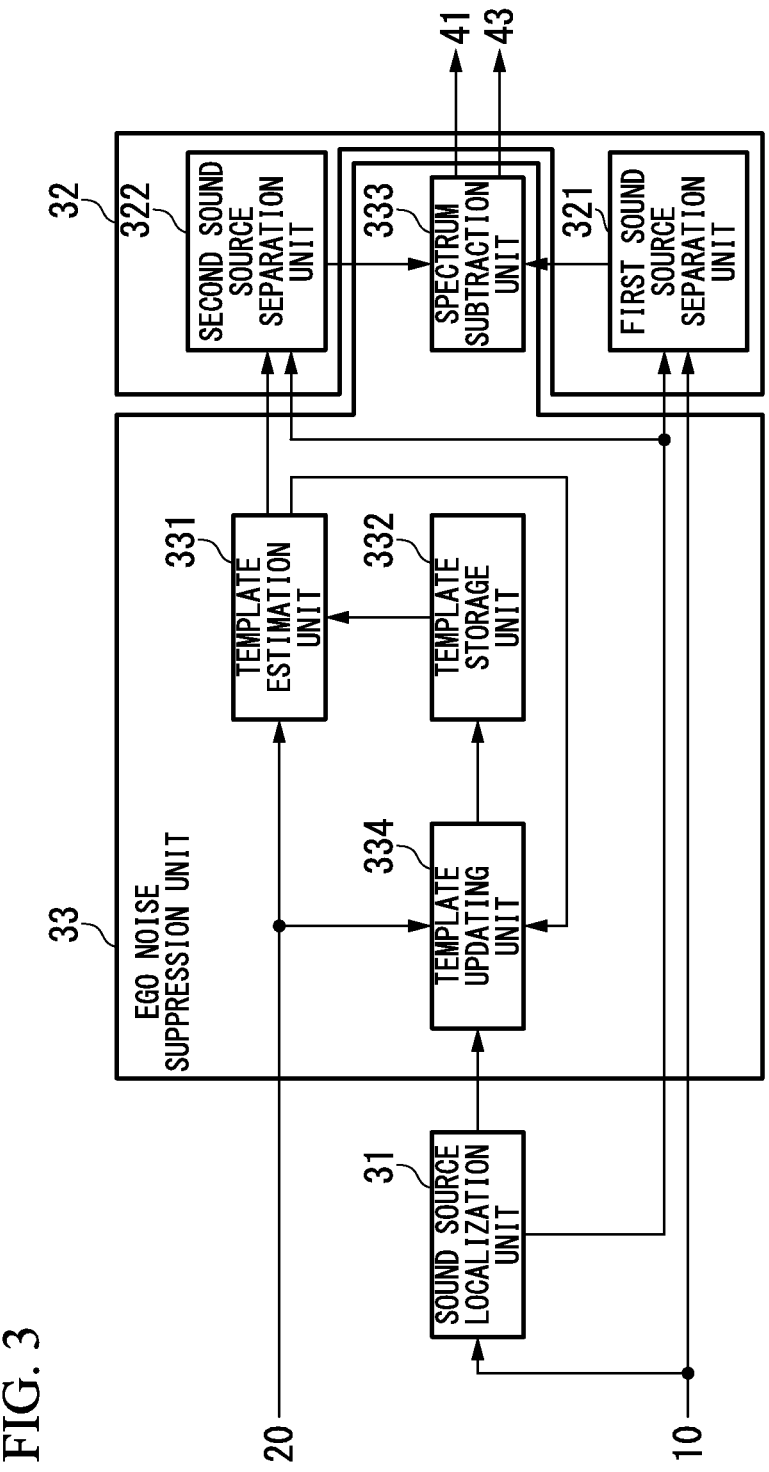
FIG. 3 is a block diagram illustrating an example of a configuration of a filtering unit according to the embodiment.

FIG. 3 is a block diagram illustrating an example of the configuration of the filtering unit 30 according to this embodiment. As shown in FIG. 3, the sound source separation unit 32 includes a first sound source separation unit 321 and a second sound source separation unit 322. The ego noise suppression unit 33 includes a template estimation unit 331, a template storage unit 332, a spectrum subtraction unit 333, and a template updating unit 334.

The first sound source separation unit 321 converts the audio signals input from the sound collection unit 10 and appearing in the time domain into complex input spectrums in the frequency domain. For example, the first sound source separation unit 321 performs a discrete Fourier transform (DFT) on the audio signals for each frame.

The first sound source separation unit 321 separates the converted complex input spectrums into music signals and speech signals using a known method based on the information indicating a sound source direction input from the sound source localization unit 31. The first sound source separation unit 321 outputs the spectrums of the separated music signals and speech signals to the spectrum subtraction unit 333 of the ego noise suppression unit 33.

The second sound source separation unit 322 outputs the estimated value of the power spectrum of the ego noise components input from the template estimation unit 331 of the ego noise suppression unit 33 to the spectrum subtraction unit 333.

The template estimation unit 331 estimates the power spectrum of the ego noise components using the information stored in the template storage unit 332 based on the operation signal input from the operation detection unit 20. The template estimation unit 331 outputs the estimated power spectrum of the ego noise component to the template updating unit 334 and the second sound source separation unit 322 of the sound source separation unit 32. Here, the template estimation unit 331 estimates the power spectrum of the ego noise component by selecting a feature vector stored in the template storage unit 332 based on the input operation signal. The operation signal may be an operation instructing signal to the robot 1 or a drive signal of the motors of the robot 1.

In the template storage unit 332, feature vectors of audio signals, noise spectrum vectors, and operation signals of the robot 1, which are acquired when the robot 1 is allowed to perform various operations in a predetermined environment are stored in correlation with each other.

The spectrum subtraction unit 333 suppresses the ego noise component by subtracting the power spectrum of the ego noise component input from the second sound source separation unit 322 from the spectrums of the music signals and the speech signals input from the first sound source separation unit 321. The spectrum subtraction unit 333 outputs the spectrums of the music signals whose ego noise component is suppressed to the music feature value estimation unit 41 of the recognition unit 40 and outputs the spectrums of the speech signals whose ego noise component is suppressed to the speech recognition unit 43 of the recognition unit 40.

The template updating unit 334 updates the information stored in the template storage unit 332 based on the power spectrum of the ego noise component output from the template estimation unit 331. The information stored in the template storage unit 332 is acquired, for example, when the robot 1 is in an initial state. Accordingly, the ego noise component may vary due to degradation of the motors or mechanisms of the robot 1. As a result, the template updating unit 334 updates the information stored in the template storage unit 332. The template updating unit 334 may delete old information stored up to that time at the time of updating the information stored in the template storage unit 332. When a template is not matched with the templates stored in the template storage unit 332, the template updating unit 334 newly stores the feature vectors of the audio signals recorded by the sound collection unit 10, the noise spectrum vectors, and the operation signals of the robot 1 in correlation with each other in the template storage unit 332. The template updating unit 334 may update the information in the template storage unit 332 by learning by causing the robot 1 to perform a predetermined operation. The update timing of the template updating unit 334 may be a predetermined timing or may be a timing at which the robot 1 recognizes music or speech.

Figure 4:
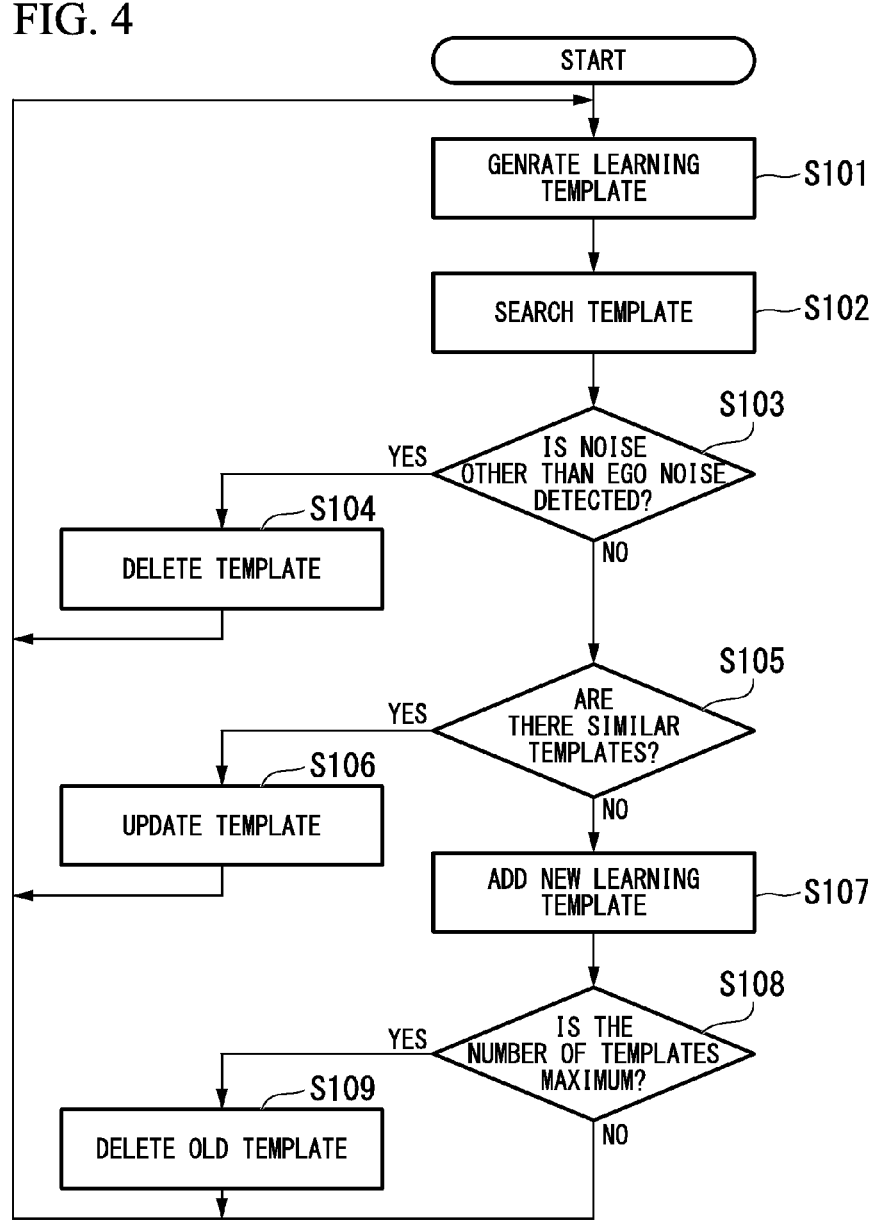
FIG. 4 is a flowchart illustrating an example of a process flow of learning a template in an ego noise suppression unit according to the embodiment.

FIG. 4 is a flowchart illustrating an example of a process flow of learning a template in the ego noise suppression unit 33 according to this embodiment.

(Step S101) The template updating unit 334 generates a learning template.

(Step S102) The template estimation unit 331 checks whether the template generated in step S101 is stored in the template storage unit 332 using a nearest neighbor (NN) method.

(Step S103) The template estimation unit 331 determines whether a template corresponding to noise other than the ego noise is detected.

The template estimation unit 331 performs the process at step S104 when it is determined that a template corresponding to noise other than the ego noise is detected (YES in step S103), and performs the process at step S105 when it is determined that a template corresponding to noise other than the ego noise is not detected (NO in step S103).

(Step S104) The template estimation unit 331 deletes the template corresponding to noise other than the ego noise from the template storage unit 332. After completion of the process at step S104, the template estimation unit 331 performs the process at step S101 again.

(Step S105) The template estimation unit 331 determines whether similar templates are stored in the template storage unit 332. The template estimation unit 331 performs the process at step S106 when it is determined that similar templates are stored in the template storage unit 332 (YES in step S105), and performs the process at step S107 when it is determined that similar templates are not stored in the template storage unit 332 (NO in step S105).

(Step S106) The template estimation unit 331 updates the information stored in the template storage unit 332, for example, by arranging the similar templates into one template. After completion of the process at step S106, the template estimation unit 331 performs the process at step S101 again.

(Step S107) The template estimation unit 331 adds a new learning template.

(Step S108) The template estimation unit 331 determines whether the size of the template storage unit 332 reaches a predetermined maximum size. The template estimation unit 331 performs the step of S109 when it is determined that the size of the template storage unit 332 reaches a predetermined maximum size (YES in step S108). On the other hand, the template estimation unit 331 performs the process at step S101 again when it is determined that the number of templates stored in the template storage unit 332 does not reach a predetermined maximum value (NO in step S108).

(Step S109) The template estimation unit 331 deletes, for example, the template whose date and time stored in the template storage unit 332 is the oldest out of the templates stored in the template storage unit 332. The templates stored in the template storage unit 332 are correlated with the dates and times in which the templates are registered.

In this way, the process of learning a template in the ego noise suppression unit 33 ends.

The process of learning a template shown in FIG. 4 is an example and the learning a template may be performed using another method. For example, by causing the robot 1 to periodically perform plural predetermined operations, all the information stored in the template storage unit 332 may be updated. The plural predetermined operations are, for example, independent operations of the individual mechanisms and combinations of several operations of the mechanisms.

The information stored in the template storage unit 332 may be stored, for example, in a server connected thereto via a network. In this case, the server may store templates of plural robots 1 and the templates may be shared by the plural robots 1.

The configuration and the operation of the music feature value estimation unit 41 will be described below.

Figure 5:
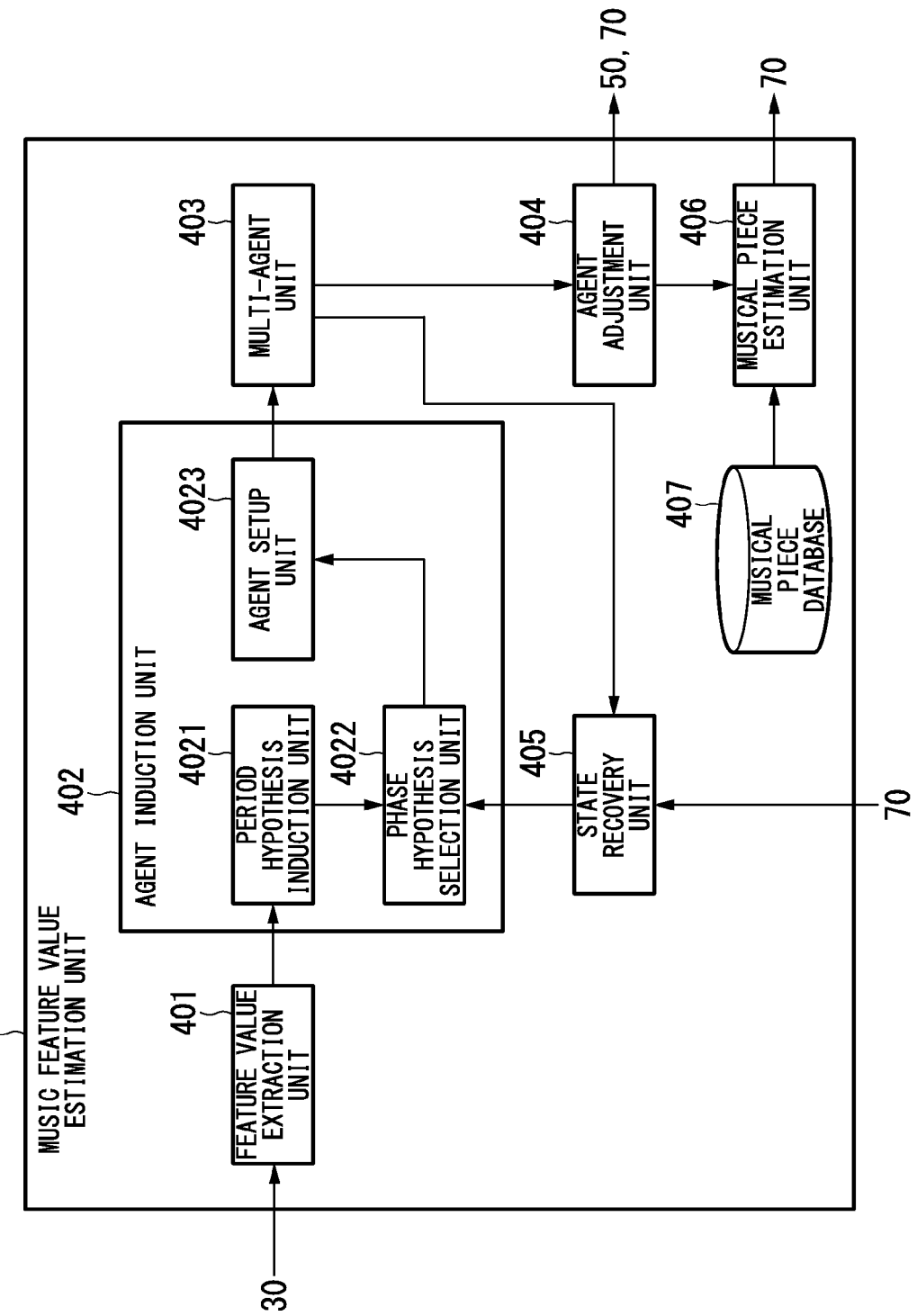
FIG. 5 is a block diagram illustrating an example of a configuration of a music feature value estimation unit according to the embodiment.

FIG. 5 is a block diagram illustrating an example of the configuration of the music feature value estimation unit 41 according to this embodiment. As shown in FIG. 5, the music feature value estimation unit 41 includes a feature value extraction unit 401, an agent induction unit 402, a multi-agent unit 403, an agent adjustment unit 404, a state recovery unit 405, a music piece estimation unit 406, and a music piece database 407.

The feature value extraction unit 401 extracts a sound feature value indicating a physical feature from music signals input from the ego noise suppression unit 33 of the filtering unit 30 and outputs the extracted sound feature value to the agent induction unit 402. The feature value extraction unit 401 calculates, for example, sound spectrums indicating the amplitude for each frequency as an amplitude-frequency characteristic, autocorrelation, and a distance based on the time difference of the sound spectrums, as the sound feature value.

The agent induction unit 402 includes a period hypothesis induction unit 4021, a phase hypothesis selection unit 4022, and an agent setup unit 4023.

The period hypothesis induction unit 4021 directly selects a symbolic event list from the sound feature value input from the feature value extraction unit 401 so as to distinguish periods, detects a peak, and continuously performs a periodicity function. For example, an autocorrelation function (ACF) is used as the periodicity function.

The period hypothesis induction unit 4021 calculates the periodicity function $A(\tau)$ based on the sound feature value input from the feature value extraction unit 401, as expressed by Expression (4).

$$A(\tau) = \sum_{n=0}^{I} \tilde{S}F(n)\tilde{S}F(n+\tau) \quad (4)$$

In Expression (4), n represents the number of frames, S to F(n) represent fixed values of smoothed spectrums in frame n, and I represents the length of a window to be introduced. The periodicity function is analyzed, for example, by applying an adaptive peak detecting algorithm of searching for K local maximum values. Here, an initial set of periodicity hypotheses P expressed by Expression (5) is constructed from the time lag $\tau$ corresponding to the detected peak.

$$\begin{cases} P_i = \mathrm{argmax}_\tau(A(\tau)) \quad i = 1, \ldots, K \\ A(\tau) > \delta \cdot \dfrac{\mathrm{rms}(A(\tau))}{T} \end{cases} \quad (5)$$

In Expression (5), $\delta$ represents a fixed threshold parameter and is set to, for example, 0.75 by experiments. T represents the range of the selected tempo and is set to, for example, 6 msec. In addition, arg max represents an argument of the maximum of a domain corresponding to the K local maximum values and rms represents a root mean square.

By using Expression (6), the phase hypothesis selection unit 4022 calculates the total sum of $\Delta$s ($\mathrm{error}_i^j$) scores for all $\gamma_i^j$ and calculates raw scores $s_{i,j}^{raw}$ for each $\Gamma_i^j$ template.

$$s_{i,j}^{raw} = \sum_{\gamma_i^j=0}^{\gamma_i^j} \Delta s(\mathrm{error}_i^j) \quad (6)$$

here, $$\mathrm{error}_i^j = m_{\gamma_i^j} - \Gamma_i^j(\gamma_i^j)$$

The agent setup unit 4023 gives the relational score $s_i^{rel}$ to the agents using Expression (7) based on $s_{i,j}^{raw}$ calculated by the phase hypothesis selection unit 4022.

$$s_i^{rel} = 10 \cdot s_i^{raw} + \sum_{k=0, k \neq i}^{K} r(n_{ik}) \cdot s_k^{raw} \quad (7)$$

The agent setup unit 4023 defines the final score $s_i$ in the estimation modes of the single and reset operations using Expression (8).

$$s_i = \frac{s_i^{rel}}{\max(s^{rel})} \cdot \max(s^{raw}) \quad (8)$$

In Expression (8), max represents the maximum value.

That is, the agent induction unit 402 detects beat intervals by generating or recursively re-generating a temporary initial set and a new set of beat intervals and beat phases as an agent. In this embodiment, plural agents are generated and used.

The multi-agent unit 403 increases temporary agents to pursue generation of agents on line, or eliminates the temporary agents, or orders the temporary agents. The multi-agent unit 403 outputs information indicating the beat intervals of the input music signals by performing the IBT in real time without receiving data in advance. The multi-agent unit 403 outputs a recovery instruction for recovering the beat tracking process or a reset instruction for resetting the beat tracking process to the state recovery unit 405 when it is necessary to recover or reset the beat tracking process. The state in which it is necessary to recover or reset the beat tracking process is a state in which it is determined that the accuracy of the beat tracking is lowered. The determination of the state is set by experiments using known indices as described later.

The agent adjustment unit 404 calculates a variation $\bar{\delta sb}_n$ obtained by the average value $\bar{sb}_n$ of the best scores of the current chunk with the previous value $\bar{sb}_{n\text{-}t_{hop}}$ using Expression (9). The superscript "⁻" represents the average value.

$$\bar{\delta sb}_n = \bar{sb}_n - \bar{sb}_{n-t_{hop}} \quad (9)$$

here, $$\bar{sb}_n = \frac{1}{W} \sum_{w=n-W}^{W} sb(n-w)$$

In Expression (9), n represents the current frame time, and W is 3 seconds and is a value when the best score in the chunk size is measured. $\bar{sb}(n)$ represents the best score measured in frame n. Here, $sb_{n\text{-}t_{hop}}$ represents the previously-compared score. The induction condition of a new agent is, for example, Expression (10).

$$\text{if } \bar{\delta sb}_{n-1} \geq \delta_{th} \wedge \bar{\delta sb} < \delta_{th} \text{ here, } \delta_{th} = 0.00 \quad (10)$$

That is, the agent adjustment unit 404 introduces a new agent when the logical product of $\delta_{th}$ and $\bar{\delta}^-sb$ is equal to or less than $\bar{\delta}^-sb_{n-1}$ and less than $\delta_{th}$ (where $\delta_{th}$ is 0.00).

The agent adjustment unit 404 changes the agents so that the scores proceeds most preferably when time varies. The agent adjustment unit 404 outputs the calculated current measurement chunk $\delta sb_n$ as the confidence function $cf_S(n)$ to the transform unit 50. The agent adjustment unit 404 estimates the beat intervals (tempo) while changing the agents so that the scores proceeds most preferably, and outputs the estimated beat intervals (tempo) to the music piece estimation unit 406 and the control unit 70.

The state recovery unit 405 controls the agent induction unit 402 so as to recover or reset the beat tracking process in response to the recovery instruction input from the multi-agent unit 403 or the recovery instruction or the reset instruction input from the control unit 70.

The music piece estimation unit 406 estimates a genre of music and a title of a piece of music using a known formula based on the beat intervals (tempo) input from the agent adjustment unit 404 and data of the pieces of music stored in the music piece database 407. The music piece estimation unit 406 outputs the estimated genre of music and the estimated title of the piece of music to the control unit 70. The music piece estimation unit 406 may estimate the genre of music and the title of the piece of music also using the sound feature value extracted by the feature value extraction unit 401.

In the music piece database 407, a feature value of a piece of music, a tempo, a title, a genre, and the like are stored in correlation with each other for plural pieces of music. In the music piece database 407, musical scores of the pieces of music may be stored in correlation with the pieces of music.

Figure 6:
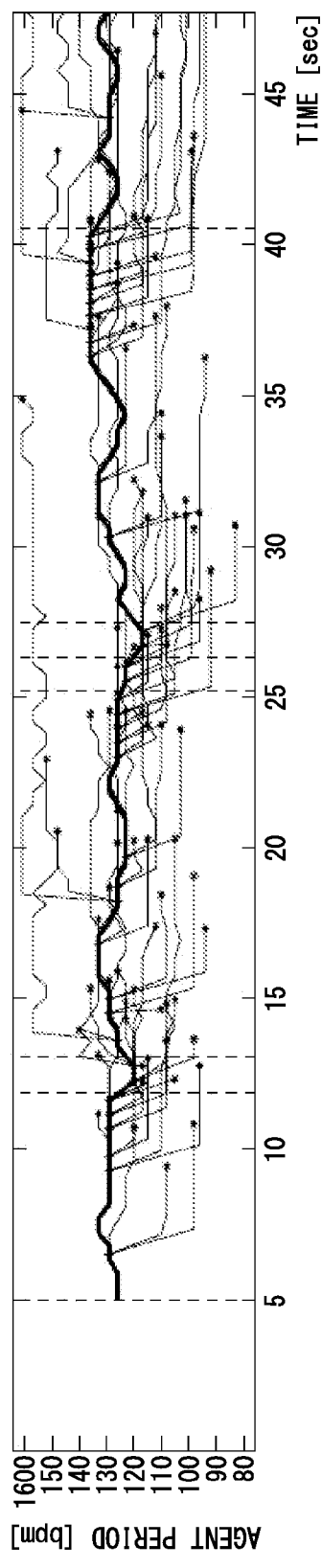
FIG. 6 is a diagram illustrating an example of an agent period when an agent is changed in the embodiment.
Figure 7:
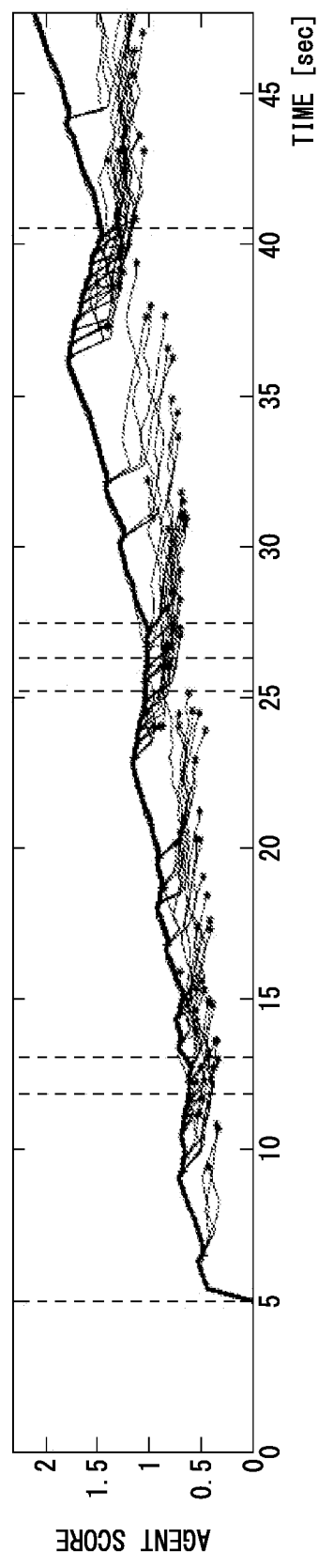
FIG. 7 is a diagram illustrating an example of a score when an agent is changed in the embodiment.

FIG. 6 is a diagram illustrating an example of an agent period when the agent is changed in this embodiment. In FIG. 6, the horizontal axis represents the time and the vertical axis represents the agent period (bpm (beats per minute)). FIG. 7 is a diagram illustrating an example of scores when the agent is changed in this embodiment. In FIG. 7, the horizontal axis represents the time and the vertical axis represents the agent score.

For example, in FIGS. 6 and 7, the best agents are sequentially switched between 12 seconds and 13 seconds and between 25 seconds and 28 seconds. On the other hand, the selected agent is continuously used, for example, between 20 seconds and 23 second and between 33 seconds and 37 seconds.

As indicated by a solid line in FIG. 7, the music feature value estimation unit 41 can stably detect the beat intervals by continuously using the agent having the best score.

The operation of the transform unit 50 will be described below.

Here, the cost of the confidence value $cf_S(n)$ of the beat tracking result is defined as $C_S(n)$, the cost of the confidence value $cf_M(n)$ of the speech recognition result is defined as $C_M(n)$, and the cost of the confidence value $cf_E(n)$ calculated by the ego noise estimation unit 42 is defined as $C_E(n)$. The threshold value of the confidence value $cf_S(n)$ is defined as $T_S$, the threshold value of the confidence value $cf_M(n)$ is defined as $T_M$, and the threshold value of the confidence value $cf_E(n)$ is defined as $T_E$. Hereinafter, the confidence value is expressed by $cf_Y$ (where Y is M, S, and E), the cost is expressed by $C_Y(n)$, and the threshold value is expressed by $T_Y$.

In this embodiment, the cost is defined by Expression (11).

$$C_Y(n) = \begin{cases} 1, & \text{if } cf_Y(n) < T_Y \\ 0, & \text{if } cf_Y(n) \geq T_Y \end{cases} \quad (11)$$

That is, when the confidence value $cf_Y(n)$ is less than the threshold value $T_Y$, the cost $C_Y(n)$ is 1. Alternatively, when the confidence value $cf_Y(n)$ is equal to or more than the threshold value $T_Y$, the cost $C_Y(n)$ is 0.

The music fitness function calculation unit 51 performs the weighting and the coupling on the costs in the fitness function $F_M(n)$ as expressed by Expression (12). The speech fitness function calculation unit 52 performs the weighting and the coupling on the costs in the fitness function $F_S(n)$ as expressed by Expression (12).

$$\begin{cases} F_M(n) = W_M^S C_S(n) + W_M^M C_M(n) + W_M^E C_E(n) \\ F_S(n) = W_S^S C_S(n) + W_S^M C_M(n) + W_S^E C_E(n) \end{cases} \quad (12)$$

In Expression (12), $W_X^Y$ (where X is M, S, and E) represents the weight of each cost in the fitness functions.

The fitness functions have different levels of fitness. Depending on the different levels of fitness, the music operation adjustment unit 61 determines the control of the robot 1 based on the music fitness function $F_M(n)$ calculated by the music fitness function calculation unit 51. The speech operation adjustment unit 62 determines the control of the robot 1 based on the speech fitness function $F_S(n)$ calculated by the speech fitness function calculation unit 52.

The weights are set to for example, $W_M^S=0$, $W_M^M=2$, $W_M^E=1$, $W_S^S=2$, $W_S^M=0$, and $W_S^E=1$. In this case, the value of the fitness function is, for example, any one of 0, 1, 2, and 3. When the value of the fitness function is small, the current operation is sustained. In this embodiment, this operation is defined as an active operation. On the other hand, when the value of the fitness function is large, the current operation is stopped. In this embodiment, this operation is defined as a proactive operation.

FIG. 8 is a diagram illustrating an example of an operation determined using a speech fitness function $F_S(n)$ in this embodiment. FIG. 9 is a diagram illustrating an example of an operation determined using a music fitness function $F_M(n)$ in this embodiment. The square indicated by reference numeral 801 shows an example of behavior responsive to music. The square indicated by reference numeral 802 shows an example of behavior responsive to speech.

The speech operation adjustment unit 62 determines the operation so as to sustain the current operation when $F_S(n)$ is 0 or 1 as indicated by reference numeral 801. For example, when the robot 1 dances to output music, the operation maintaining unit 74 controls the robot 1 so as to sustain the dancing operation depending on the operation details determined by the speech operation adjustment unit 62.

The speech operation adjustment unit 62 determines the operation so as to suppress the ego noise when $F_S(n)$ is 2 as indicated by reference numeral 801. In this case, it can be considered, for example, that the recognition rate in the speech recognizing process is lowered. Accordingly, the noise suppression unit 75 controls the robot 1 so as to suppress the operational sound or to slow down the operation depending on the operation details determined by the speech operation adjustment unit 62.

Alternatively, the speech operation adjustment unit 62 determines the operation so as to stop the current operation when $F_S(n)$ is 3 as indicated by reference numeral 801. In this case, it can be considered, for example, that it is difficult to perform the speech recognizing process. Accordingly, the operation stopping unit 76 controls the robot 1 so as to stop the dancing operation depending on the operation details determined by the speech operation adjustment unit 62.

The music operation adjustment unit 61 determines the operation so as to sustain the current operation when $F_M(n)$ is 0 or 1 as indicated by reference numeral 802. For example, the operation maintaining unit 71 controls the robot 1 so as to sustain the beat tracking operation with the current setting depending on the operation details determined by the music operation adjustment unit 61.

The music operation adjustment unit 61 determines the operation so as to recover the beat tracking process when $F_M(n)$ is 2 as indicated by reference numeral 802. In this case, it can be considered, for example, that the detection accuracy of the beat intervals in the beat tracking process is lowered. Accordingly, the recovery unit 72 outputs, for example, the recovery instruction to the music feature value estimation unit 41 depending on the operation details determined by the music operation adjustment unit 61.

Alternatively, the music operation adjustment unit 61 determines the operation so as to stop the current operation when $F_M(n)$ is 3 as indicated by reference numeral 802. In this case, it can be considered, for example, that it is difficult to perform the beat tracking process. Accordingly, the reset unit 73 outputs, for example, the reset instruction to the music feature value estimation unit 41 depending on the operation details determined by the music operation adjustment unit 61.

Experiment Result

An experiment example which was performed by allowing the robot 1 (see FIG. 1) according to this embodiment to have operated will be described below. The experiment was carried out under the following conditions. 8 microphones mounted on the outer circumference of the head part of a humanoid robot were used as the sound collection unit 10.

When templates to be stored in the template storage unit 332 were learned, tempos were randomly selected from a tempo range of 40 (bpm) to 80 (bpm) and the robot was caused to perform three dancing operations for 5 minutes.

When acoustic models were learned, a Japanese Newspaper Article Sentence (JNAS) corpus was used as a training database for learning Japanese. A corpus extracted from English newspapers was used as a database for learning English.

Sound sources used in the experiment were recorded in a noisy room with a room size of 4.0 m×7.0 m×3.0 m and with an echo time RT20 of 0.2 seconds. The music signals were recorded at a music signal-to-noise ratio (M-SNR) of −0.2 dB. The speech signals were recorded at a speech signal-to-noise ratio (S-SNR) of −3 dB. Speeches from difference speakers were used as the sound sources used in the experiment for each record and audio signals of 8 channels were recorded for 10 minutes.

The types of music used in the experiment were 7 types of pop, rock, jazz, hip-hop, dance, folk, and soul. The tempos of music used were in a range of 80 bpm to 140 bpm and the average was 109±17.6 bpm. Data of music used in the experiment were 10-minute records prepared by extracting the music and coupling the extracted music every 20 seconds.

The speeches used in the experiment were speeches of 4 males and speeches of 4 females. These speeches were recorded under the above-mentioned conditions and 10-minute speech data were prepared. In the speech data, in case of Japanese, words were connected as a continuous stream with a 1-second mute gap was interposed between words.

First, synchronization between operations and beats in a dance of the robot 1 will be described.

Figure 10:
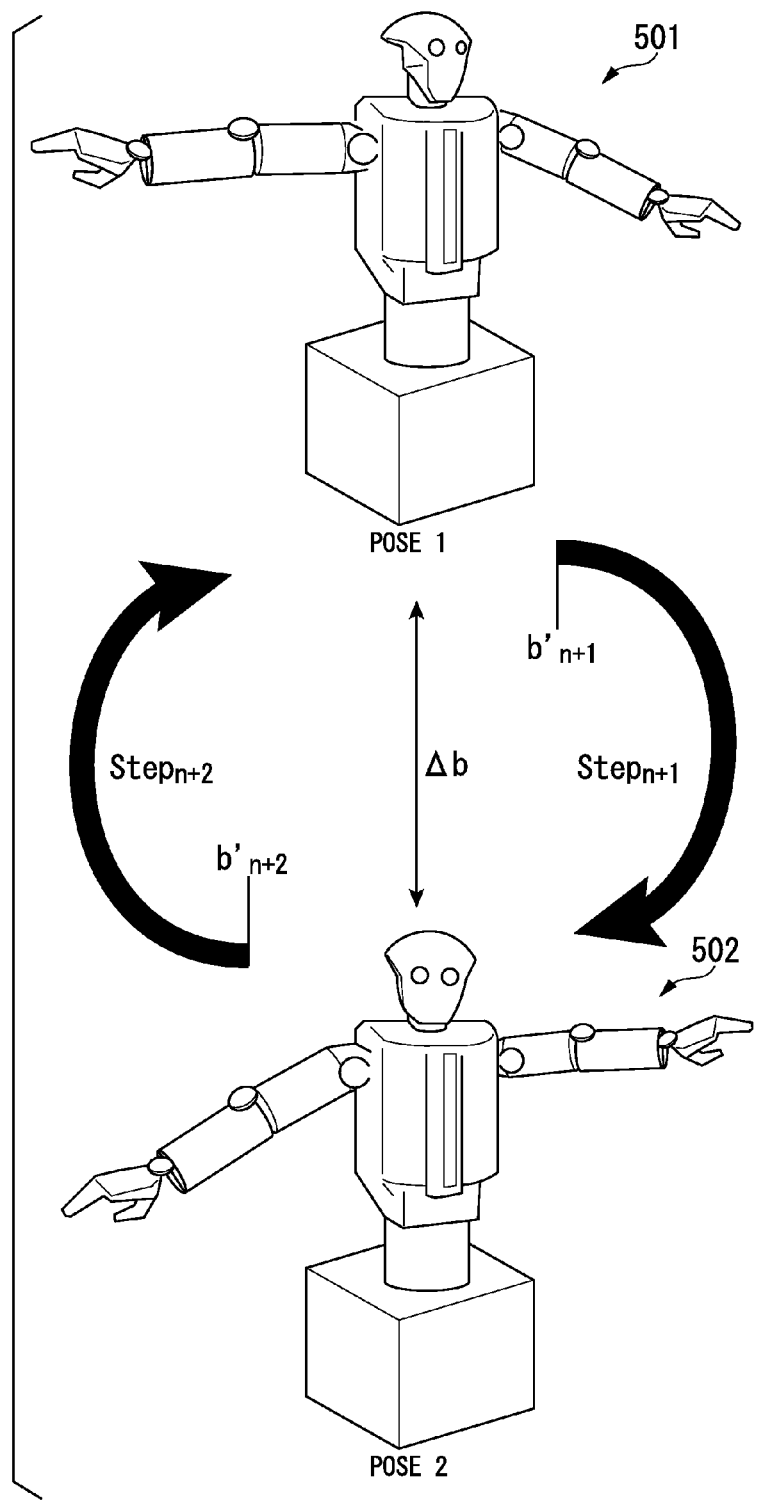
FIG. 10 is a diagram illustrating synchronization of an operation with beats in a dance performed by a robot according to the embodiment.

FIG. 10 is a diagram illustrating synchronization of an operation with beats in a dance of the robot 1 according to this embodiment. In the experiment, the robot 1 dances by performing operations to music. As in the image area indicated by reference numeral 501 in FIG. 10, a pose of the robot 1 in which the right arm is raised and the left arm is lowered is defined as Pose 1. As in the image area indicated by reference numeral 502, a pose of the robot 1 in which the left arm is raised and the right arm is lowered is defined as Pose 2.

Pose 1 and Pose 2 are taken in synchronization with beats. Pose 1 is defined as event $b'_{n+1}$ and is changed to a next step $step_{n+1}$ after Event 1. Pose 2 is defined as event $b'_{n+2}$ and is changed to a next step $step_{n+2}$ after Event 1.

There is a relationship expressed by Expression (13) among the communication delay time, the step change request, and the actual operation.

$$\begin{cases} b'_{n+1} = b_n + \Delta b - d_n \\ \Delta b = b_n - b_{n-1} \end{cases} \quad (13)$$

In Expression (13), $\Delta b$ represents a predetermined current inter-beat interval (IBI) obtained by estimating the time difference between the events of the final two beats. In addition, $b_n$ and $b_{n-1}$ represent a delay of the final behavioral response of the robot 1 estimated by $b_t$ and $d_n$. This delay is re-calculated for the events $b_n$ of all the estimated beats as expressed by Expression (14).

$$d_n = r_{n-1} - b_{n-1} \quad (14)$$

In Expression (14), $b'_{n-1}$ represents the timing of the previous beat event prediction. In addition, $r_{n-1}$ represents the timing of the behavioral response to the final step change request. This response timing $r_{n-1}$ is given as a time frame n in which the robot 1 starts the operation in response to the final step change request as expressed by Expression (15).

$$r_{n-1} = \arg_n |E(n)| \text{here}, E(n) > s_{thres} \tag{15}$$

In Expression (15), E(n) represents the average velocity in the time frame of a joint of the robot 1. In addition, $s_{thres}=0.1$ represents the empirical threshold value for E(n) for marking all the boundaries at which it is considered that the robot 1 stops or moves.

When a change request is given at a time at which the robot 1 moves in a new step, the step is changed to a next step based on the determination. Alternatively, the robot 1 ends the stop in the current step at the time of the next beat event prediction before change to the next step.

By this determination, the robot 1 dances to the beats without an influence of a delay in communication speed.

Here, quantization of beat tracking will be described below. For the beat tracking process, AMLt (Allowed Metrical Levels) which does not require continuity was used. The following evaluation values were introduced based on AMLt. $AMLt_s$ was obtained by measuring the accuracy of the entire flow. $AMLt_c$ was obtained by simulating the individual evaluations associated with extraction music connected by measuring the accuracy of the entire flow. Here, in $AMLt_e$, the first 5 seconds were discarded after each change of music.

In order to measure the reaction time $r_t$ for each change of music, $r_t$ is defined $|b_r - t_t|$ like a time difference between the change timing $t_t$ and the first beat timing $b_r$ including first four continuous accurate beats during extraction of music.

The speech recognition rate was measured from the viewpoint of an average word correct rate (WCR). The WCR is defined as the number of words accurately recognized from test sets divided by the total number in the example.

The above-mentioned $AMLt_s$ and $AMLt_e$ were used to measure the degree of synchronization between the dance and the beats of music. In this regard, the temporal match of beats detected from a sound stream was compared with the dancing step change timing. Specifically, it was checked what beat was used to synchronize the dance of the robot 1. In order to acquire the dancing step change timing, the timing of the minimum average velocity was acquired by applying an algorithm of detecting the minimum value of an average velocity signal described in Reference Document 2.

In order to evaluate the robot 1 according to this embodiment, the accuracies of the beat tracking and the speech recognition were measured using different input signals obtained by applying different pre-processing techniques. In the following description, ENS means an ego noise suppression process in the ego noise suppression unit 33.

1) 1 channel: audio signal recorded by a single (front) microphone 2) 1 channel+ENS: be obtained by refining 1 channel through ENS 3) 8 channel: signals separated from the audio signal recorded by an 8-channel microarray using the sound source localization unit 31 and the sound source separation unit 32, in which the separated speech signals and music signals are output to the speech recognition unit 43 and the music feature value estimation unit 41, respectively.

4) 8 channel+ENS: be obtained by refining 8 channel through ENS

In order to observe an effect of a sound environment adjustment for the purpose of beat tracking, performance of the IBT in non-regulated audio signals was compared. In this case, as described above, the beat tracking process is recovered or reset in response to a request under a sound condition in which the confidence value for music processing which is the IBT regulation is low for the performance of the IBT in regulated audio signals which is the IBT-default.

Figure 11:
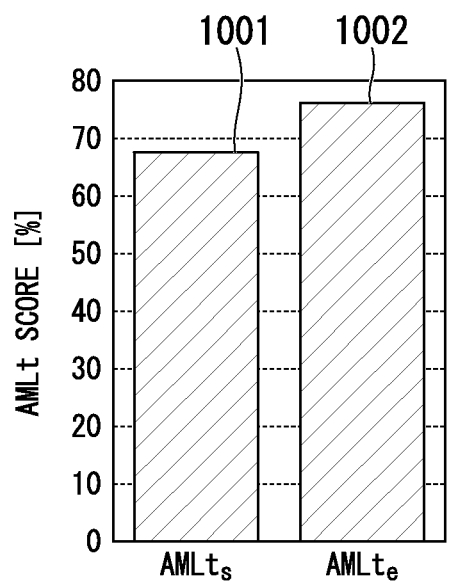
FIG. 11 is a diagram illustrating an example of synchronization with an average dancing beat from the viewpoint of $AMLt_s$ and $AMLt_c$ scores.
Figure 12:
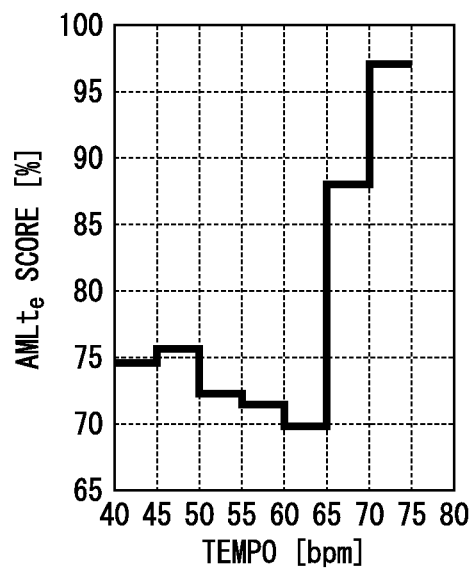
FIG. 12 is a diagram illustrating an $AMLt_e$ score distribution in a music tempo function at an increment of 5 bpm.
Figure 13:
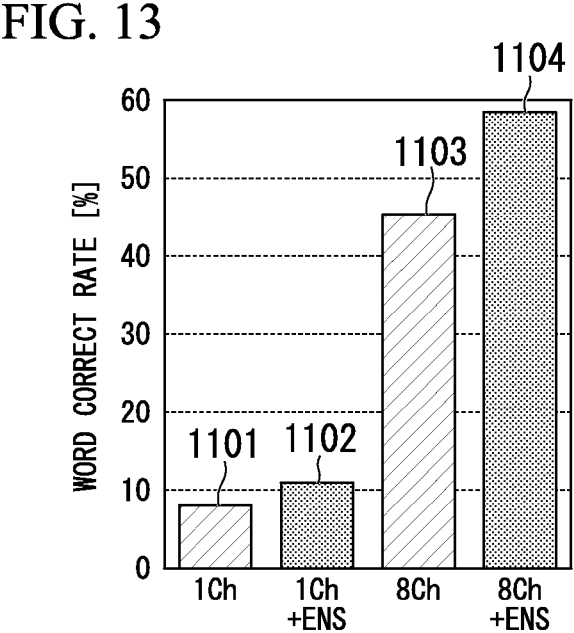
FIG. 13 is a diagram illustrating an average speech recognition result of all variations in a system.
Figure 14:
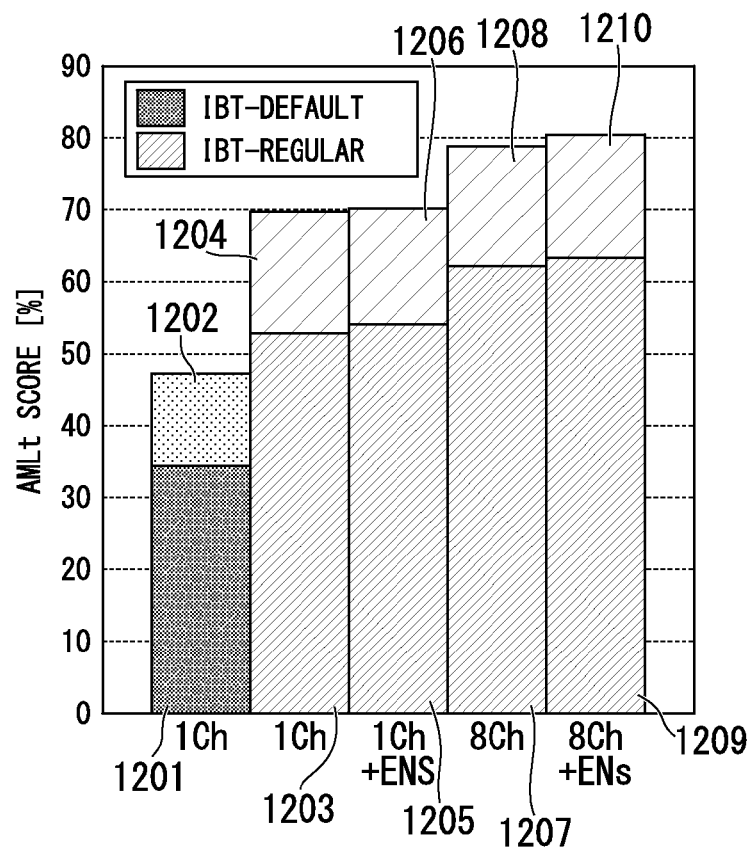
FIG. 14 is a diagram illustrating an example of all beat tracking accuracies of IBT-default and IBT-regular from the viewpoint of $AMLt_s$ and $AMLt_c$ scores.
Figure 15:
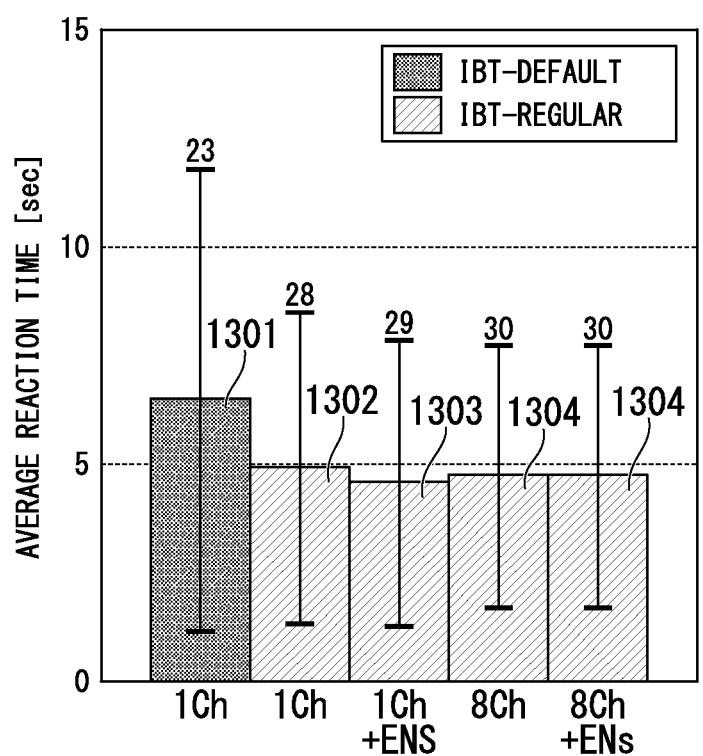
FIG. 15 is a diagram illustrating an average reaction time and the number of processes normally changed in a data stream of tested music.

FIG. 11 is a diagram illustrating an example of synchronization with an average dancing beat from the viewpoint of $AMLt_s$ and $AMLt_e$ scores. FIG. 12 is a diagram illustrating an $AMLt_c$ score distribution in a music tempo function at an increment of 5 bpm. FIG. 13 is a diagram illustrating an average speech recognition result of all variations in a system. FIG. 14 is a diagram illustrating an example of all beat tracking accuracies of IBT-default and IBT-regular from the viewpoint of $AMLt_s$ and $AMLt_c$ scores. FIG. 15 is a diagram illustrating an average reaction time and the number of processes normally changed in a data stream of tested music.

First, the results about synchronization of dance will be described.

In FIG. 11, the horizontal axis represents $AMLt_s$ and $AMLt_e$ and the vertical axis represents the AML score. As in the image indicated by reference numeral 1001 in FIG. 11, the algorithm according to this embodiment of generating movement of a beat-synchronous robot dance could reproduce 67.7% of the entire beat synchronization from the viewpoint of the $AMLt_s$ score. By discarding the first 5 seconds, effective change of music was achieved and the $AMLt_e$ score of 75.9% was obtained as in the image indicated by reference numeral 1002 in FIG. 10. The score difference 8% between $AMLt_s$ and $AMLt_e$ is considered to be based on the influence of a variation in motor speed or the like of the robot 1.

In FIG. 12, the horizontal axis represents the tempo and the vertical axis represents the $AMLt_e$ score. As shown in FIG. 12, the $AMLt_e$ score is in a range of 70% to 75% at the tempo of 40 bpm to 65 bpm and the $AMLt_e$ score is in a range of 88% to 97% at a tempo of 65 bpm to 75 bpm. This difference in performance is considered to be based on the timing of acquiring the dancing step change timing determined by the use of the minimum average velocity.

Since the peak velocity change required for a high tempo (faster change) is detected rather than the flat velocity change required for a low tempo (slow change), it is more accurate. However, as shown in FIG. 11, the movement of the robot 1 means that the robot moves in synchronization with the tempo, from the viewpoint of human perception.

Next, the speech recognition results will be described.

In FIG. 13, the horizontal axis represents 1 channel (IBT-regular), 1 channel+ENS (IBT-default), 8 channel (IBT-regular), and 8 channel+ENS (IBT-default), and the vertical axis represents the word correct rate. As shown in FIG. 13, since the sound source localization unit 31 and the sound source separation unit 32 are mounted (signals of 8 channels) as a pre-process, the word correct rate of the speech recognition could be significantly improved by 35.8 pp (percentage points) in average.

Next, the beat tracking results with respect to music will be described.

In FIG. 14, the horizontal axis represents 1 channel (IBT-default), 1 channel (IBT-regular), 1 channel+ENS, 8 channel, and 8 channel+ENS, and the vertical axis represents the AMLt score.

In FIG. 14, the image indicated by reference numeral 1201 shows the $AMLt_s$ score in the IBT-default and the image indicated by reference numeral 1202 shows the $AMLt_e$ score in the IBT-default. In FIG. 14, the images indicated by reference numerals 1203, 1205, 1207, and 1209 show the $AMLt_s$ scores in the IBT-regular, and the images indicated by reference numerals 1204, 1206, 1208, and 1210 show the $AMLt_e$ scores in the IBT-regular.

As shown in FIG. 14, in a signal recorded by 1 channel, when the IBT is regulated for the IBT-default, the beat tracking accuracy increases by 18.5 pp for the $AMLt_s$ score and increases by 22.5 pp for the $AMLt_e$ score. This is because when both are compared for the 1-channel signal under the same conditions, the increase in accuracy is reflected as the decrease by 1.6 seconds in the reaction time in the change of music.

As a result, the IBT regulation was ±2.0 seconds and the beat tracking could be recovered from the change of music within an average reaction time of 4.9 without any statistical significance in the results (average value P=0.76±0.18) under all the signal conditions.

As described above, by applying this embodiment to an 8-channel signal, the beat tracking accuracy was improved by 9.5 pp for $AMLt_e$ and 8.9 pp for $AMLt_s$ which are 62.1% and 78.6% at most.

In FIG. 15, the horizontal axis is the same as in FIG. 14 and the vertical axis represents the average reaction time. In FIG. 15, the images indicated by reference numerals 1301 to 1304 represent the results of $AMLt_s$. Furthermore, in FIG. 15, the vertical lines and the numbers represent the number of streams in music to which the beat tracking process can be applied. More specifically, in 1 channel of IBT-default, the beat tracking process can be applied to 23 streams among 30 streams, and the beat tracking process can be applied to 28 to 30 streams according to this embodiment.

As shown in FIG. 14, in 1 channel and 8 channel of the IBT-regular, the $AMLt_s$ could be improved by 1.2 pp and the $AMLt_e$ could be improved by 1.0 pp by performing the ENS.

As a result, for the IBT-regular in 8 channel+ENS, the $AMLt_s$ was 63.1%, the $AMLt_e$ was 80.0%, and the average reaction time 4.8±3.0 seconds.

Figure 16:
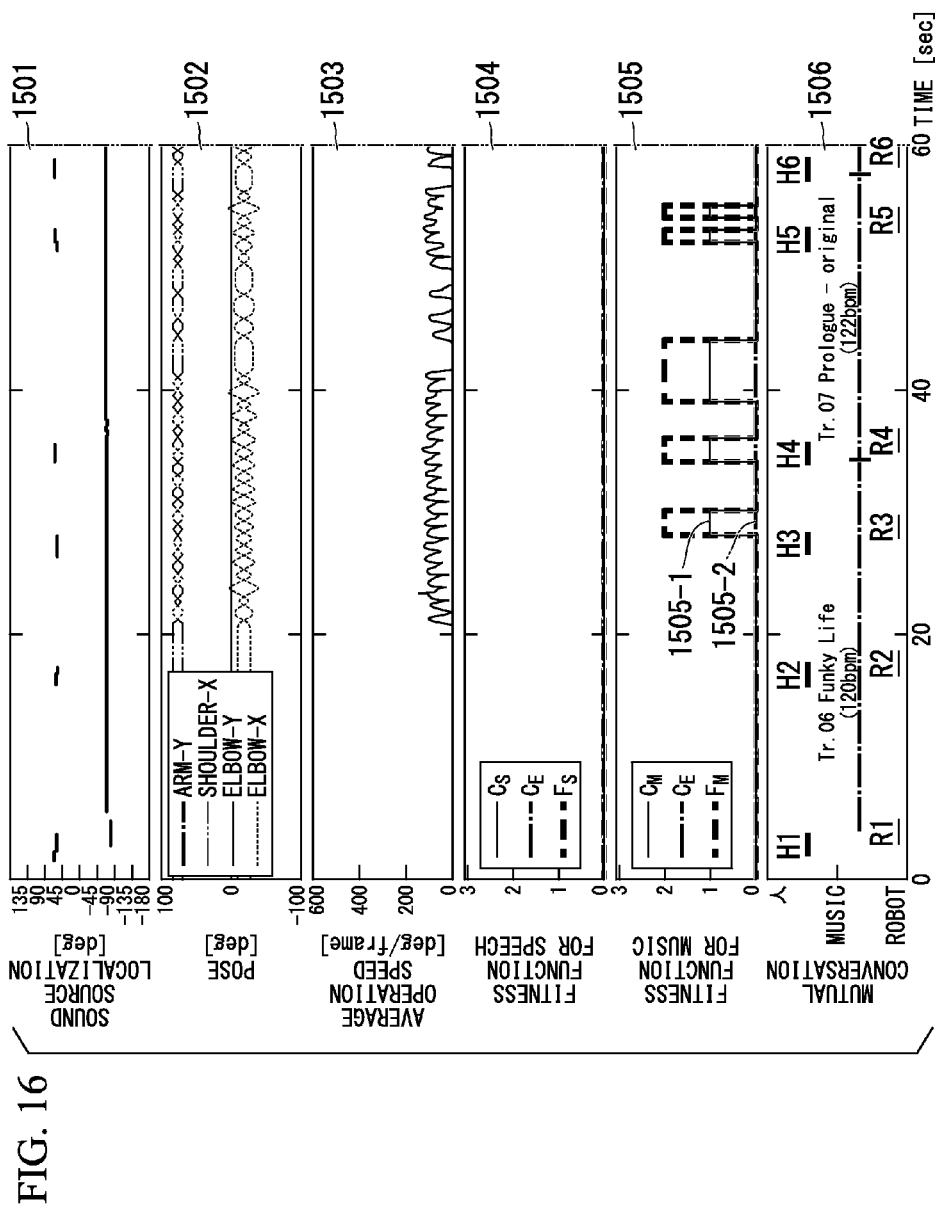
FIG. 16 is a diagram illustrating an example of an operation result of a robot when the robot according to this embodiment is allowed to hear music and speech.
Figure 17:
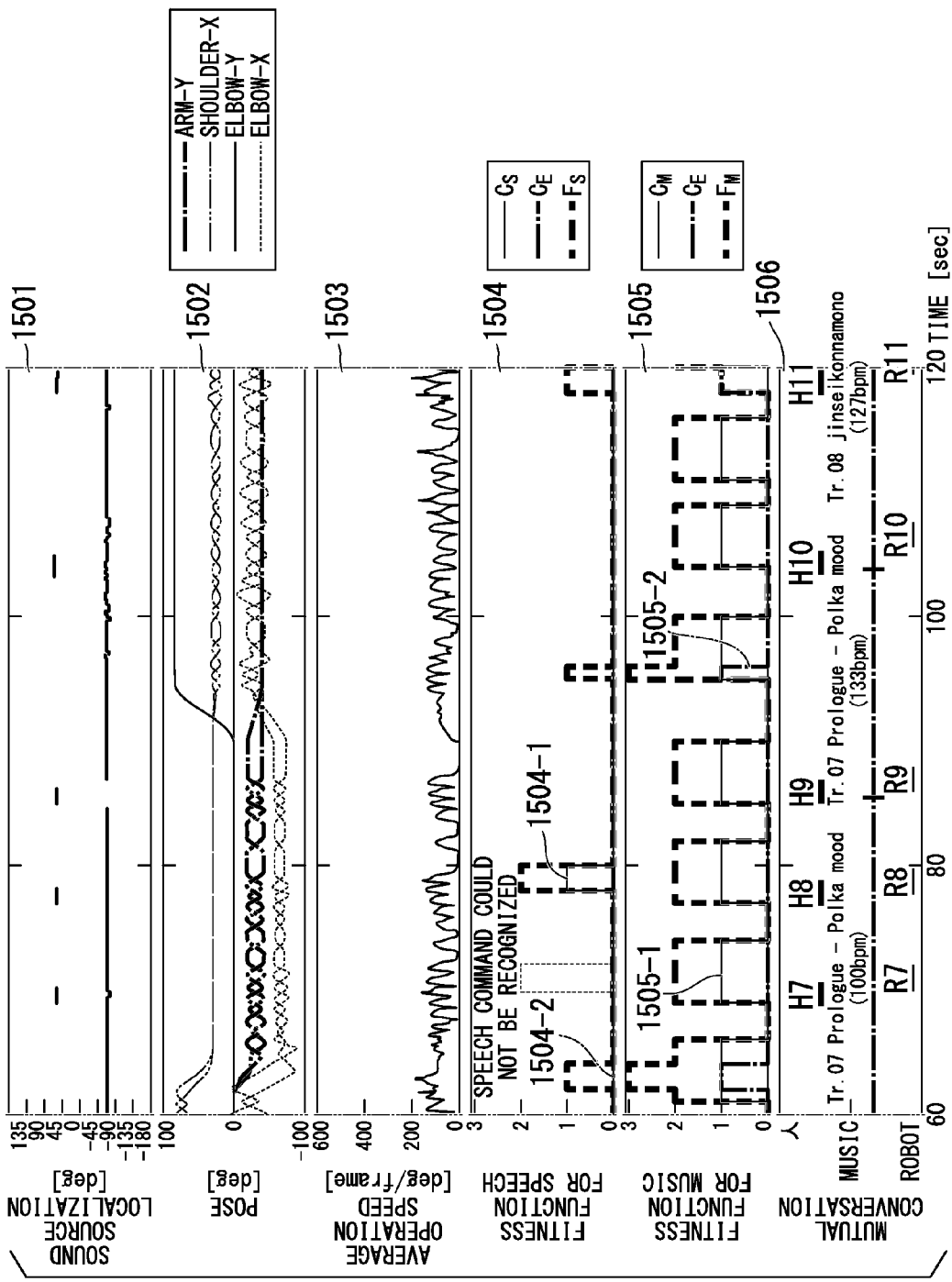
FIG. 17 is a diagram illustrating an example of an operation result of a robot when the robot according to this embodiment is allowed to hear music and speech.
Figure 18:
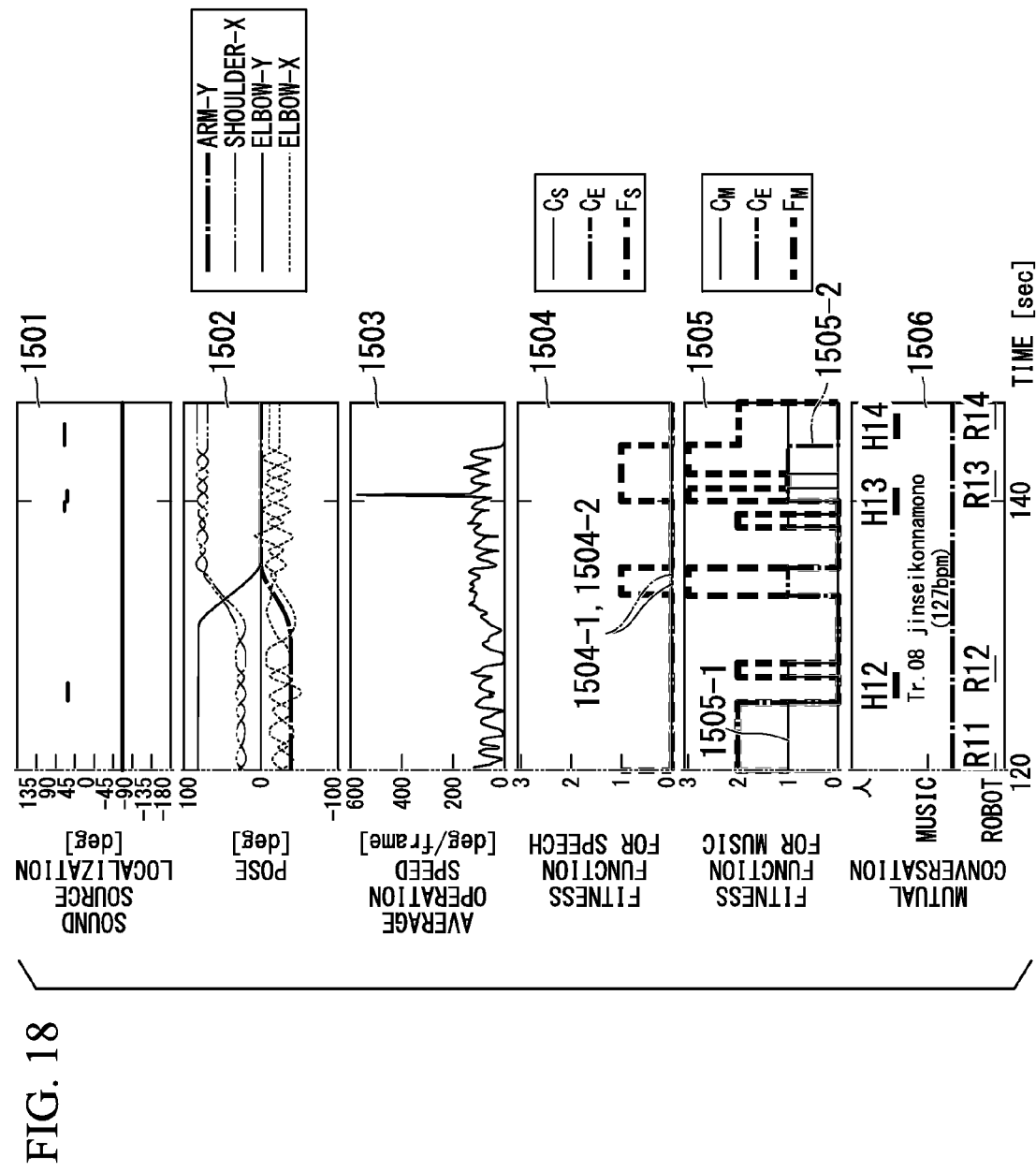
FIG. 18 is a diagram illustrating an example of an operation result of a robot when the robot according to this embodiment is allowed to hear music and speech.

FIGS. 16 to 19 are diagrams illustrating an example of the operation result of the robot 1 when the robot 1 according to this embodiment is allowed to hear music and speech. In FIGS. 16 to 18, the horizontal axis represents the time. An image indicated by reference numeral 1501 in FIGS. 16 to 18 represents the sound source localization result, and an image indicated by reference numeral 1502 represents an arm, a shoulder, an angle of an elbow in the Y axis direction, and an angle of the elbow in the X axis direction of the robot 1. An image indicated by reference numeral 1503 represents the average operating speed of the mechanisms, the image indicated by reference numeral 1504 represents the value of the fitness function $F_S$ for speech, and an image indicated by reference numeral 1505 represents the value of the fitness function $F_M$ for beat tracking. An image indicated by reference numeral 1506 represents mutual conversation between the robot 1 and a person.

In the image indicated by reference numeral 1504, reference numeral 1504-1 represents the value of the cost function $C_S$, reference numeral 1505-2 represents the value of the cost function $C_E$. In the image indicated by reference numeral 1505, reference numeral 1505-1 represents the value of the cost function $C_M$ and reference numeral 1505-2 represents the value of the cost function $C_E$. In the image indicated by reference numeral 1506, symbol H represents utterance of a person, and symbol R represents utterance of the robot 1.

In the experiment shown in FIGS. 16 to 19, music was output from one speaker and one person gave speech.

In FIG. 16, first, the robot 1 utters "Yes!" (R1) in response to "Would you reproduce music?" (H1) included in a speech signal and then starts performance of music (about 2 seconds). The tempo of the music played at this time is 120 bpm.

Then, the robot 1 utters "Yes!" (R2) in response to "Can you dance?" (H2) included in the speech signal and then starts dancing (about 18 seconds). With the start of dancing, as in the image indicated by reference numeral 1503, the operating speed of the mechanisms increases at about 20 seconds.

Then, the robot 1 utters "Tempo is 60 bpm!" (R3) in response to "What is the tempo of this music?" (H3) included in the speech signal (about 29 seconds). At the time of 29 seconds, since $C_S$ is 0 and $C_E$ is 0, $F_S$ is 0. Since $C_M$ is 1 and $C_E$ is 0, $F_M$ is 2. The weighting coefficients are the same as described above. That is, at the time of 29 seconds, since the beat tracking process malfunctions and the value of the fitness function $F_M$ is 2, the robot 1 performs a process of recovering the beat tracking process.

Then, the robot 1 utters "Yes!" (R4) in response to "Change music!" (H4) included in the speech signal and then changes the music (about 35 seconds). The tempo of the music played at this time is 122 bpm.

At the time of about 55 seconds, the robot 1 utters "Title is polonaise!" (R5) in response to "What is the title of this music?" (H5) included in the speech signal. As in the images indicated by reference numeral 1504 and reference numeral 1505, the value of fitness function $F_S$ is 0 and the value of the fitness function $F_M$ is 2. Since the value of the fitness function $F_M$ is 2, the robot 1 performs the process of recovering the beat tracking process.

Then, the robot 1 utters "Yes!" (H6) in response to "Change mood!" (H6) included in the speech signal and then changes the music (about 58 seconds). The tempo of the music played at this time is 100 bpm.

At the time of about 61 seconds in FIG. 17, as in the images indicated by reference numeral 1504 and reference numeral 1505, the value of the fitness function $F_S$ is 0 because the value of the cost function $C_S$ is 0, and the value of the fitness function $F_M$ is 2 because the value of the cost function $C_M$ is 1.

At the time of about 62 seconds, as in the images indicated by reference numeral 1504 and reference numeral 1505, the value of the fitness function $F_S$ is 1 because the value of the cost function $C_S$ is 1, and the value of the fitness function $F_M$ is 3 because the value of the cost function $C_M$ is 1 and the value of the cost function $C_E$ is 1. Accordingly, since the value of the fitness function $F_M$ is 3, the robot 1 resets the beat tracking process.

At the time of about 78 seconds, "Change mood!" (H7) included in the speech signal is recorded. At the time of about 78 seconds, as in the images indicated by reference numeral 1504 and reference numeral 1505, the value of the fitness function $F_S$ is 0 because the value of the cost function $C_S$ is 0, and the value of the fitness function $F_M$ is 2 because the value of the cost function $C_M$ is 1. However, since the speech could not be recognized, the robot 1 utters "Would you please speak again?" (R7).

At the time of about 78 seconds, the robot recognizes "Change mood!" (H8) included in the speech signal. At the time of about 88 seconds, as in the images indicated by reference numeral 1504 and reference numeral 1505, the value of the fitness function $F_S$ is 2 because the value of the cost function $C_S$ is 1, and the value of the fitness function $F_M$ is 2 because the value of the cost function $C_M$ is 1. At this time, since the speech could not be recognized, the robot 1 utters "Would you please speak again?" (R8). On the other hand, since the value of the fitness function $F_S$ is 2, the robot 1 controls the operating speed of the robot 1 so as to be lowered to suppress the ego noise of the robot 1.

As a result, at the time of about 84 seconds, the robot utters "Yes!" (R9) in response to "Change mood!" (H9) included in the speech signal and then changes the music (about 86 seconds). The tempo of the music played at this time is 133 bpm.

At the time of about 86 seconds, as in the images indicated by reference numeral 1504 and reference numeral 1505, the value of the fitness function $F_S$ is 0 because the value of the cost function $C_S$ is 0, and the value of the fitness function $F_M$ is 2 because the value of the cost function $C_M$ is 1. In this way, since the robot 1 is controlled depending on the value of the fitness function, the robot 1 can recognize the utterance at the time of about 84 seconds.

The music is changed and the dancing is continued. Accordingly, at the time of about 95 seconds, as in the images indicated by reference numeral 1504 and reference numeral 1505, the value of the fitness function $F_S$ is 1 because the value of the cost function $C_S$ is 1, and the value of the fitness function $F_M$ is 3 because the value of the cost function $C_M$ is 1 and the value of the cost function $C_E$ is 1. Accordingly, since the value of the fitness function $F_M$ is 3, the robot 1 resets the beat tracking process.

As described above, the sound process device (robot 1) according to this embodiment includes: a separation unit (sound source separation unit 32) configured to separate at least a music signal and a speech signal from a recorded audio signal; a noise suppression unit (ego noise suppression unit 33) configured to perform a noise suppression process of suppressing noise from at least one of the music signal and the speech signal separated by the separation unit; a music feature value estimation unit (music feature value estimation unit 41) configured to estimate a feature value of the music signal from the music signal; a speech recognition unit 43 configured to recognize speech from the speech signal; a noise-processing confidence calculation unit (ego noise estimation unit 42) configured to calculate a noise-processing confidence value which is a confidence value relevant to the noise suppression process; a music feature value estimation confidence calculation unit (music fitness function calculation unit 51) configured to calculate a music feature value estimation confidence value which is a confidence value relevant to the process of estimating the feature value of the music signal; a speech recognition confidence calculation unit (speech fitness function calculation unit 52) configured to calculate a speech recognition confidence value which is a confidence value relevant to the speech recognition; and a control unit 70 configured to calculate at least one behavioral decision function of a speech behavioral decision function associated with speech and a music behavioral decision function associated with music based on the noise-processing confidence value, the music feature value estimation confidence value, and the speech recognition confidence value and to determine behavior corresponding to the calculated behavioral decision function.

By employing this configuration, the robot 1 recognizes speech from a person and changes music depending on the recognized speech details. The robot 1 outputs speech representing the tempo of the music and the title of the music, depending on the recognized speech details.

As shown in FIGS. 16 to 18, the robot 1 according to this embodiment selects the change in operating speed of the robot 1 and sound volume of music played, the recovery of the beat tracking process, and the reset of the beat tracking process as a responsive process depending on the value of the fitness function, and performs a control based on the selected behavioral response. As a result, the robot 1 according to this embodiment detects beats of the music played and dances to the detected beats. With this dancing, ego noise increases in the audio signal recorded by the robot 1. Even in this situation, the robot 1 according to this embodiment continues to perform the beat tracking process, recognizes speech of a person, and operates based on the recognized speech.

The experiment results shown in FIGS. 16 to 19 is an example, and the robot 1 may select the behavioral responses of the functional units of the robot 1 depending on the values of the fitness functions $F_S$ and $F_M$. For example, the sound source localization unit 31 and the sound source separation unit 32 may be controlled so as to enhance an amplification factor of the audio signal recorded by the sound collection unit 10 depending on the value of the fitness function $F_S$. For example, the amplification factor may be controlled to 1.5 times when the value of the fitness function $F_S$ is 2, and the amplification factor may be controlled to 2 times when the value of the fitness function $F_S$ is 3.

In this embodiment, an example where the value of the fitness function is 0, 1, 2, and 3 has been described, but the number of values of the fitness function has only to be two or more. That is, the number of values of the fitness function may be two of 0 and 1, or may be five or more of 0 to 4. In this case, the determination unit 60 may also select the behavioral response depending on the values of the fitness function and may control the units of the robot 1 based on the selected behavioral response.

While the robot 1 is exemplified above as equipment having the sound processing device mounted thereon, the embodiment is not limited to this example. The sound processing device includes the same functional units as in the robot 1 shown in FIG. 1. The equipment on which the sound processing device is mounted may be equipment that operates in the course of processing an audio signal therein and emits the operational sound thereof. An example of such equipment is a vehicle on which an engine, a DVD player (Digital Versatile Disk Player), and an HDD (Hard Disk Drive) are mounted. That is, the sound processing device may be mounted on equipment that is an operation control target and that cannot directly acquire a sound generated due to the operation.

A program for realizing the function of the robot 1 according to the present invention may be recorded in a computer-readable recording medium, a computer system may read the program recorded on the recording medium and executed to perform estimation of a sound source orientation. Here, the computer system includes an OS and hardware such as peripherals. The "computer system" also includes a WWW system including a homepage provision environment (or display environment). The "computer-readable recording medium" includes a portable medium such as a flexible disc, a magneto-optical disc, a ROM, or a CD-ROM or a storage device such as a hard disk built in the computer system. Moreover, the "computer-readable recording medium" also includes a device storing a program for a predetermined time, like an internal volatile memory (RAM) of a computer system serving as a server or a client when the programs are transmitted through a network such as the Internet or a communication line such as a telephone line.

The above programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

REFERENCE DOCUMENTS

Reference Document 1: J. L. Oliveira, F. Gouyon, L. G. Martins, and L. P. Reis, "IBT: A Real-time Tempo and Beat Tracking System", in Int. Soc. for Music Information Retrieval Conf., 2010, pp. 291-296.

Reference Document 2: K. Nakadai et al., "Active audition for humanoid," in National Conference on Artificial Intelligence, 2000, pp. 832-839.

What is claimed is:

1. A sound processing device comprising:
   a separation unit configured to separate at least a music signal and a speech signal from a recorded audio signal;
   a noise suppression unit configured to perform a noise suppression process of suppressing noise from at least one of the music signal and the speech signal separated by the separation unit;
   a music feature value estimation unit configured to estimate a feature value of the music signal from the music signal;
   a speech recognition unit configured to recognize speech from the speech signal;
   a noise-processing confidence calculation unit configured to calculate a noise-processing confidence value which is a confidence value relevant to the noise suppression process;
   a music feature value estimation confidence calculation unit configured to calculate a music feature value estimation confidence value which is a confidence value relevant to the process of estimating the feature value of the music signal;
   a speech recognition confidence calculation unit configured to calculate a speech recognition confidence value which is a confidence value relevant to the speech recognition; and
   a control unit configured to calculate at least one behavioral decision function of a speech behavioral decision function associated with speech and a music behavioral decision function associated with music based on the noise-processing confidence value, the music feature value estimation confidence value, and the speech recognition confidence value and to determine behavior corresponding to the calculated behavioral decision function.

2. The sound processing device according to claim 1, wherein the control unit is configured to determine a behavioral response associated with the speech recognition unit based on the speech behavioral decision function and to determine a behavioral response associated with the music feature value estimation unit based on the music behavioral decision function.

3. The sound processing device according to claim 1, wherein the control unit is configured to reset the music feature value estimation unit when the music feature value estimation confidence value and the speech recognition confidence value are both smaller than a predetermined value.

4. The sound processing device according to claim 1, wherein the speech behavioral decision function is a value calculated based on cost functions calculated based on the noise-processing confidence value, the music feature value estimation confidence value, and the speech recognition confidence value and predetermined weighting coefficients for the calculated cost functions, and
   wherein the music behavioral decision function is a value calculated based on cost functions calculated based on the noise-processing confidence value, the music feature value estimation confidence value, and the speech recognition confidence value and predetermined weighting coefficients for the calculated cost functions.

5. A sound processing method comprising:
   a separation step of causing a separation unit to separate at least a music signal and a speech signal from a recorded audio signal;
   a noise suppression step of causing a noise suppression unit to perform a noise suppression process of suppressing noise from at least one of the music signal and the speech signal separated by the separation unit;
   a music feature value estimating step of causing a music feature value estimation unit to estimate a feature value of the music signal therefrom;
   a speech recognizing step of causing a speech recognition unit to recognize speech from the speech signal;
   a noise-processing confidence calculating step of causing a noise-processing confidence calculation unit to calculate a noise-processing confidence value which is a confidence value relevant to the noise suppression process;
   a music feature value estimation confidence calculating step of causing a music feature value estimation confidence calculation unit to calculate a music feature value estimation confidence value which is a confidence value relevant to the process of estimating the feature value of the music signal;
   a speech recognition confidence calculating step of causing a speech recognition confidence calculation unit to calculate a speech recognition confidence value which is a confidence value relevant to the speech recognition; and
   a control step of causing a control unit to calculate at least one behavioral decision function of a speech behavioral decision function associated with speech and a music behavioral decision function associated with music based on the noise-processing confidence value, the music feature value estimation confidence value, and the speech recognition confidence value and to determine behavior corresponding to the calculated behavioral decision function.

* * * * *